US012291989B2

(12) United States Patent
Oqab et al.

(10) Patent No.: US 12,291,989 B2
(45) Date of Patent: May 6, 2025

(54) SYSTEM AND METHOD FOR TRANSPORT VEHICLES USING RECYCLABLE FUELS

(71) Applicant: Oqab Dietrich Induction Inc., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 0 days.

(21) Appl. No.: 18/553,637

(22) PCT Filed: Mar. 31, 2022

(86) PCT No.: PCT/CA2022/050496
§ 371 (c)(1),
(2) Date: Oct. 2, 2023

(87) PCT Pub. No.: WO2022/204819
PCT Pub. Date: Oct. 6, 2022

(65) Prior Publication Data
US 2024/0183306 A1  Jun. 6, 2024

Related U.S. Application Data

(60) Provisional application No. 63/168,362, filed on Mar. 31, 2021.

(51) Int. Cl.
*F02B 45/00* (2006.01)
*F02B 45/06* (2006.01)
(Continued)

(52) U.S. Cl.
CPC .............. *F02B 45/06* (2013.01); *F02B 63/04* (2013.01); *F02B 77/14* (2013.01); *F02G 1/04* (2013.01);
(Continued)

(58) Field of Classification Search
CPC ... F02M 27/02; F02K 9/24; F02K 9/70; F23B 2900/00003; C06B 33/00;
(Continued)

(56) References Cited

U.S. PATENT DOCUMENTS

| 7,963,115 B1 | 6/2011 | Sondergaard et al. |
| 11,976,573 B2 * | 5/2024 | Oqab .................. F23C 10/00 |
| 11,988,178 B2 * | 5/2024 | Oqab .................. C06B 33/00 |

FOREIGN PATENT DOCUMENTS

| WO | 2014063740 A1 | 5/2014 |
| WO | 2016058618 A1 | 4/2016 |

(Continued)

OTHER PUBLICATIONS

CIPO as International Searching Authority, International Search Report and Written Opinion for PCT/CA2022/050496, Jun. 30, 2022.

*Primary Examiner* — Long T Tran
*Assistant Examiner* — James J Kim
(74) *Attorney, Agent, or Firm* — Own Innovation Inc.; James W. Hinton

(57) ABSTRACT

Provided are systems and methods for transport vehicles using recyclable metallic fuels. The method includes capturing fuel products, including a metal oxide and unburnt fuel from the combustion of a metallic fuel, storing the unburnt metallic fuel and the fuel products, and recycling the metal oxide to recreate the metallic fuel and/or byproducts. Heat generated by the combustion and/or sintering of the metallic fuel may be transferred to a working fluid to drive the production of electricity and/or to provide propulsion in land, air and water vehicles and spacecraft. Furthermore, the thermal energy harvesting system may be used to generate electricity. The system includes a thermal (heat) engine having an induction heating assembly for heating the metal- (Continued)

lic fuel. Processes for complete combustion of the metallic fuel and recycling the metallic fuel in a sintering loop are described.

13 Claims, 35 Drawing Sheets

(51) Int. Cl.
*F02B 63/04* (2006.01)
*F02B 77/14* (2006.01)
*F02G 1/04* (2006.01)
*F02G 5/04* (2006.01)

(52) U.S. Cl.
CPC ............ *F02G 5/04* (2013.01); *F02B 2275/46* (2013.01); *F02B 2700/00* (2013.01); *F05D 2220/32* (2013.01)

(58) Field of Classification Search
CPC ... C10L 2200/0204; F23C 2900/99008; B64G 1/002; F02B 2275/46
USPC .......................................................... 123/23
See application file for complete search history.

(56) References Cited

FOREIGN PATENT DOCUMENTS

| WO | 2020049528 A1 | 3/2020 |
| WO | 2020174453 A1 | 9/2020 |
| WO | 2021203211 A1 | 10/2021 |

* cited by examiner

Carbothermal Reduction: $MOx + CH_4 \rightarrow CO + 2H_2 + M$

Methanation: $CO + 3H_2 \rightarrow CH_4 + H_2O$

Electrolysis: $H_2O \rightarrow 2H_2 + \tfrac{1}{2} O_2$

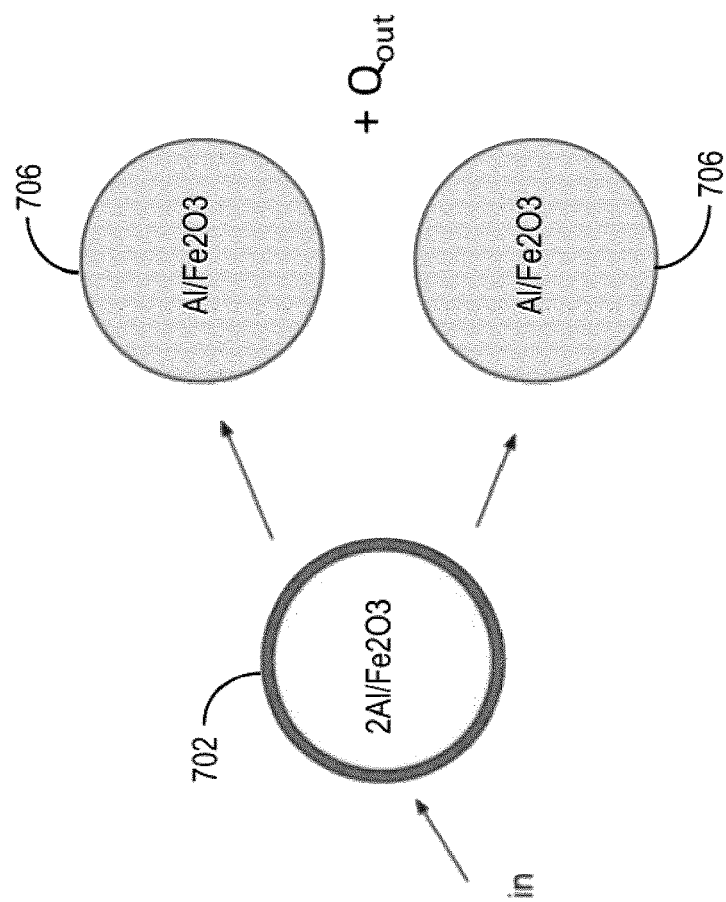
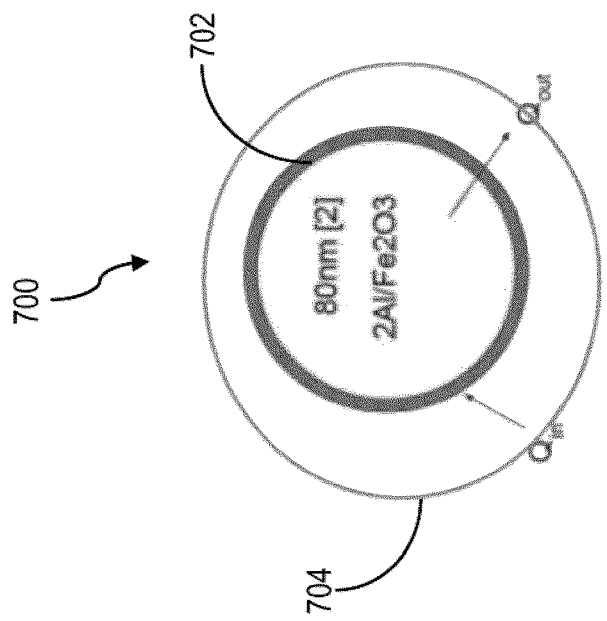
FIG. 4A
FIG. 4B

Aeronautical Application

SELF, ELF, VLF, LF, MF, HF,
VHF, UHF, SHF, EMF,
Geo-magnetic & sub ELF
sources
- Extremely Low
  Frequency
- Very Low Frequency,
  Radio Frequency
  spectrum
- Microwaves
- Infrared,
- visible light,
- ultra violet,
- sunlight Astronautical Application SELF, ELF, VLF, LF, MF, HF, VHF,
UHF, SHF, EMF, Infrared,
visible light, ultra violet, sunlight,
X-rays, Gamma Rays, & Cosmic
Rays

- Geo-magnetic & sub ELF
  sources
- Extremely Low Frequency
- Very Low Frequency, Radio
  Frequency spectrum
- Microwaves
- Terahertz
- Infrared,
- visible light,
- ultra violet,
- sunlight
- X-rays
- Gamma Rays
- Cosmic Rays

FIG. 6

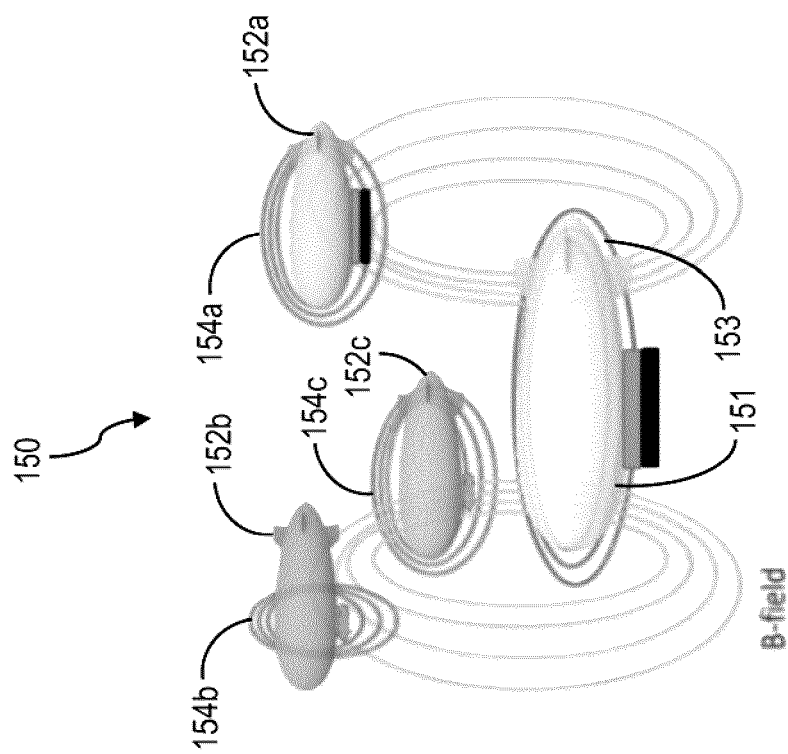
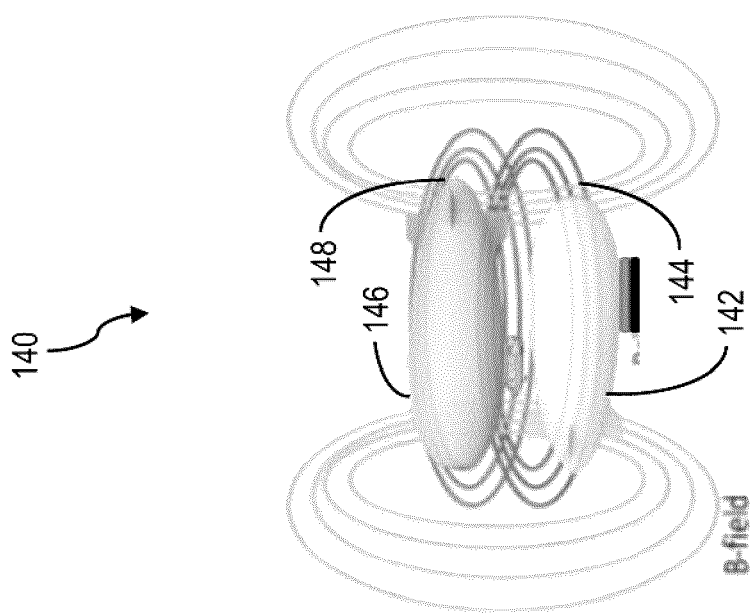
FIG. 19

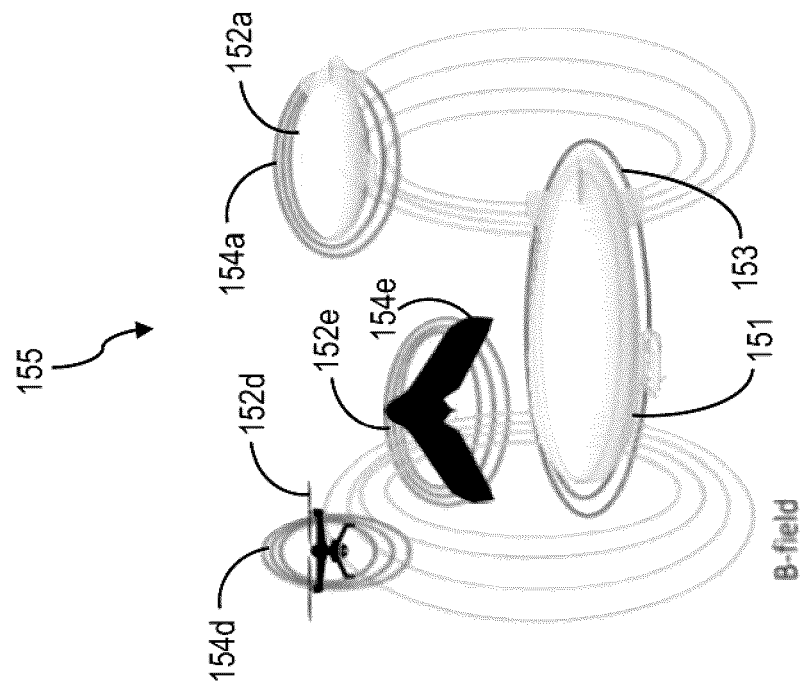
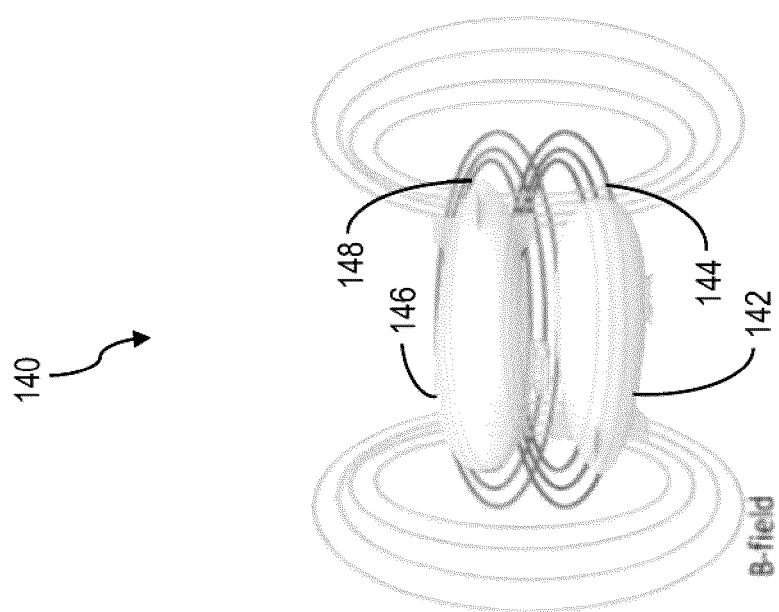
FIG. 20

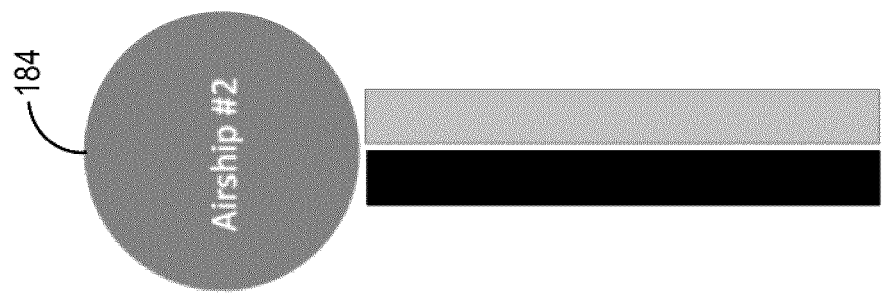
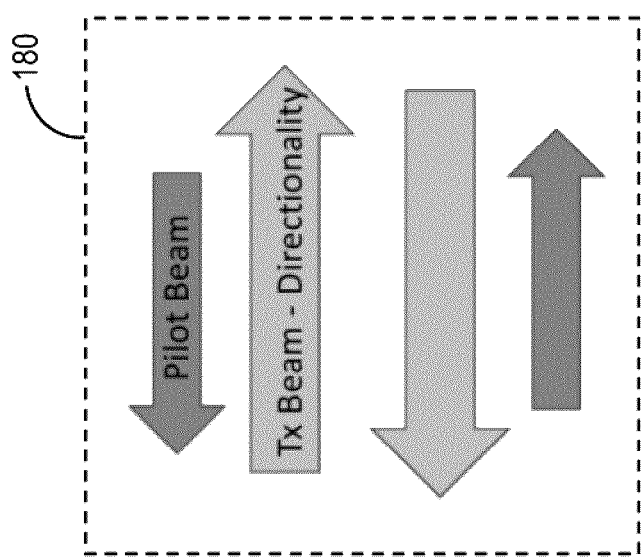
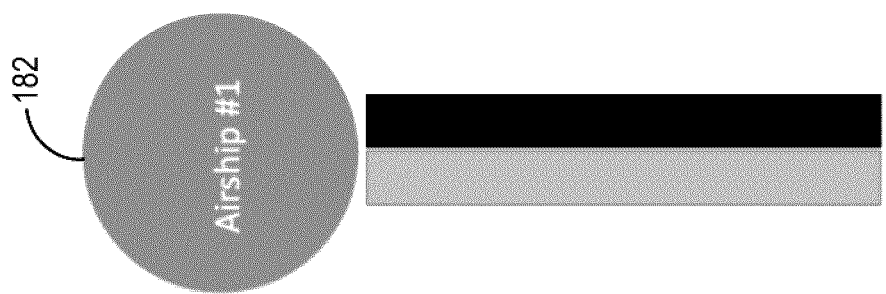
FIG. 23

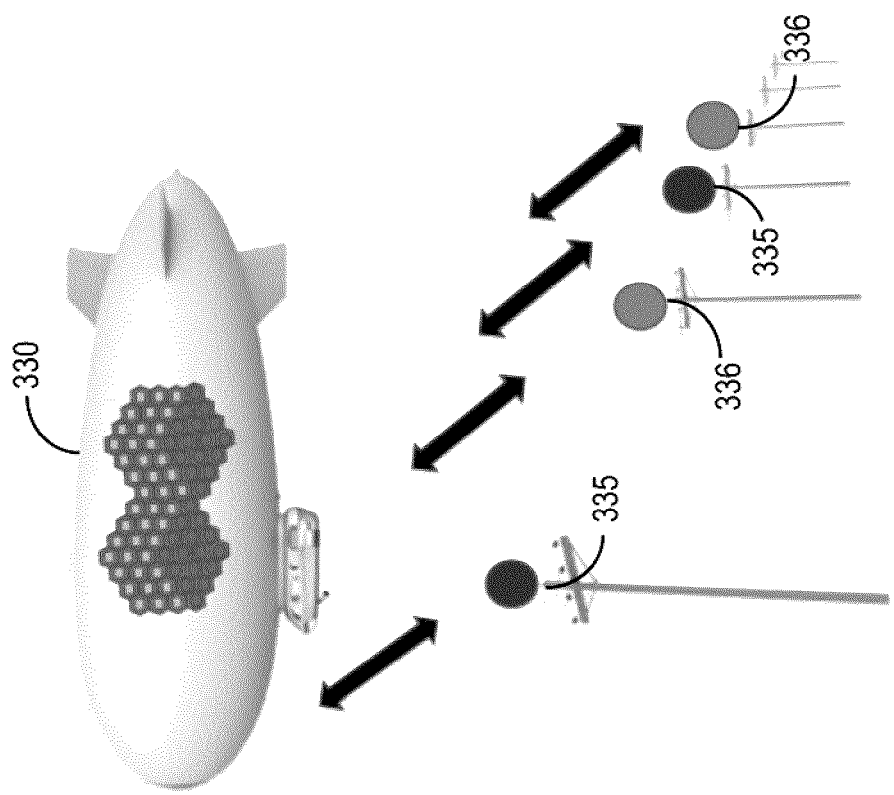

SYSTEM AND METHOD FOR TRANSPORT VEHICLES USING RECYCLABLE FUELS

TECHNICAL FIELD

The embodiments disclosed herein relate to fuel for propulsion and/or powering systems and, in particular to systems and methods for propulsion and power generation in transport vehicles using recyclable fuels.

INTRODUCTION

Dependence on fossil fuels is driving an environmental crisis by increasing concentrations of atmospheric greenhouse gases, which studies link to elevating average global temperatures and accelerating disruptive climate change. On the other hand, standards of living are directly correlated with per capita energy consumption, with the result that the desire to improve quality of life prompts consumption of higher and higher levels of energy per person. These circumstances, coupled with a continually growing population, consequently drive global energy requirements for clean renewable energy sources to be scaled up to meet demand while simultaneously replacing fossil fuels use for the largest energy needs including transportation and/or electrical and/or thermal power generation.

In addition, in-space powering and propulsion of space systems using existing, conventional fuels (including solid and or liquid propellant) brought from Earth are costly and impractical systems and methods for use over large distances or for long time periods given the weight/volume requirements and other challenges of storing fuel onboard. Transporting fuel to from Earth to orbit, and point to point travel in space, is also problematic given the high volatility of most conventional fuels and is further limited by size/weight requirements of spacecraft and/or launch vehicles. A further limitation is that the range of a spacecraft is restricted by the amount of fuel carried onboard, and once fuel reserves are depleted, the spacecraft can no longer propel or maneuver itself.

Fuels such as metallic fuels can be used for heating and combustion as an alternative energy source to meet energy demands on Earth and in Space. Metals have high energy densities and as such can also be used in many batteries, as energetic materials, and/or as propellants. Oxidation of metal powders can be used as an efficient energetic carrier and source for a number of applications. The exothermic reaction between the metal and an oxidizer release heat and generates products such as metal oxides. Metal oxides can themselves also be combusted in the presence of a metal in the form of nano- and or micro-thermites. In an implementation, by using the energy release to create heat to accelerate a fluid within a nozzle and/or create heat for a heat engine, thrust may be generated. In another implementation, by using the energy release to heat a fluid within an electrical and/or thermal power generation system, power may be generated. In more general cases, a metal and an oxidizer, often air and/or water, is used as the carrier fluid, and as the source of oxidation of the metal. In other cases, the fuel and oxidizer, in the form of a thermite, can be both located in a metallic particle (for example a metal oxide coat on the outside of a metal particle) and or combusted providing heat to a carrier fluid. In either case these can be referred to as the metallic fuels (such as metal, metallic, and/or energetic particles, thermites and/or micro, and/or nano-thermites, or the like).

Metallic fuels may contain energetic particles which are made up of a fuel and an oxidizer-typically a metal and a metal oxide, respectively. Nanothermites are composed of both the oxidizer and fuel compose each particle-which are on the scale of 100 nanometers or below—the energy release per mass of particle is very large. In an implementation, using metallic fuel propellant including nanothermites or microthermites, or a combination thereof, may be used in any inert carrier gas and or liquid to disperse the propellant within the combustion chamber for an effective heating and/or combustion, leading to controllable power and/or thrust generation.

Metallic fuels (e.g., thermites, microthermites, nanothermites) have high energy density, and when mixed with an inert gas and/or liquid carrier fluid, are generally safer to handle and transport than conventional fuels. They can be synthesized and manufactured, and transported to be used and/or stored for future use. They are present in abundance on Earth and in Space. Propellants/fuel can be produced, stored and transported for dispatchable power. Stored energy can be in the form of fuels that can be used to generate power and propulsion.

Metallic fuels can be heated/combusted in a thermal power plant to generate steam to drive the production of electricity. Metallic fuels can also be combusted in a vehicle engine for propulsion. Products of nanothermite reactions are themselves a clean energy source of metals and/or metal oxides that can be captured, used and/or recycled. The products and/or byproducts of heating and combustion of fuels may be captured and recycled using terrestrial power generation systems employing renewable energy sources (e.g., solar, wind, thermal, nuclear, power beaming or the like).

Accordingly, there is a need for new systems and methods for transport vehicles to use recyclable metallic fuels for propulsion and power generation.

SUMMARY

Provided is a method for producing electricity and propulsion from recyclable metallic fuels. The method includes inductively heating a metallic fuel, causing at least partial combustion of the metallic fuel, transferring heat from the at least partial combustion of the metallic fuel to a working fluid to generate steam, using the steam to drive generation of electricity, and using the steam to drive propulsion of a vehicle.

The metallic fuel may be one or more of: a nanothermite, a microthermite and thermite. The metallic fuel may include a metal and an oxidizer. The oxidizer may be a second metal oxide.

The method may further include capturing fuel products and unburnt fuel from incomplete combustion of the metallic fuel, wherein the fuel products include a first metal oxide, directing the unburnt metallic fuel and the fuel products to storage and/or further oxidation, and recycling the first metal oxide to recreate the metallic fuel and/or other products.

The fuel products may further include a metal that is oxidizable for heating and/or combustion.

The method may further include inductively generating electricity using heat from the unburnt metallic fuel and the fuel products.

The method may further include recycling the fuel products by one or more chemical processes to produce the other products.

The one or more chemical processes may include one or more of: hydrogenation, methanation, carbothermal reduction and electrolysis.

The metallic fuel may be heterogeneous comprising metallic particulates surrounded by a binder. The binder may be a nanocomposite hydrogel.

The metallic fuel may be heterogeneous comprising metallic particles and a catalyst for catalytic oxidation of the metallic particles or catalytic reduction of the fuel byproducts.

The catalyst may be stimuli-responsive being chemically, mechanically, magnetically and or thermally activatable.

Energy for the one or more chemical processes may be provided by inductive-coupled and/or magnetic resonance wireless energy transmission.

The method may further include synthesizing the metallic fuel from a plurality of fuel sources harvested from the Earth, Moon, Mars, other planets, asteroids, planetoids, other celestial bodies, or a combination thereof.

The method may further include controlling volumetric heating of the metallic fuel to regulate combustion.

The vehicle may be one of: a land vehicle, an aerial vehicle and a water vehicle.

Provided is a vehicle configured to use a recyclable metallic fuel for propulsion. The vehicle includes a fuel tank for storing the metallic fuel, a water source, a mixing tank, for mixing the metallic fuel and water to form a slurry, a heat engine having an induction heating assembly, wherein the slurry is inductively heated in the heat engine causing at least partial combustion of the metallic fuel, a closed loop heat transfer system for transferring heat from the at least partial combustion of the metallic fuel to generate steam, and a propulsion system connected to the heat transfer system, wherein the propulsion system is driven by the steam to move the vehicle.

The vehicle may further include an electrical generator driven by the steam to produce electricity for powering onboard systems.

The vehicle may further include a thermoelectric system connected to the heat engine to passively capture and convert excess heat from the at least partial combustion of the metallic fuel into electricity.

The vehicle may further include at least one combustion chamber for combusting the metallic fuel, at least one reaction chamber for generating thermal power using heat from unburnt metallic fuel and fuel products, at least one storage system for capturing the unburnt metallic fuel and the fuel products, and at least one recycling system for directing the captured unburnt metallic fuel and/or the fuel products to the at least one combustion chamber and/or the at least one reaction chamber.

The vehicle may further include one or more storage tanks for storing the unburnt metallic fuel and the fuel products.

The vehicle may further include a second fuel recycling system comprising: a second reaction chamber for reducing the fuel byproducts by one or more reductive processes to regenerate the metallic fuel, and a second recycling system for directing the fuel byproducts from the at least one storage system to the second reaction chamber.

The vehicle may further include one or more of: rectennas and solar panels, for receiving energy wirelessly, wherein the energy may be used to power the induction heating assembly.

The vehicle may further include a magnetic induction coil.

The vehicle may further include a temperature regulating system for controlling the volumetric heating of the metallic fuel in the heat engine.

The vehicle may further include a second fuel tank for storing a secondary fuel, and the secondary fuel is combusted with the metallic fuel in the heat engine.

The secondary fuel may be a hydrocarbon.

The vehicle may be one of: a land vehicle, an aerial vehicle, a water vehicle and a spacecraft.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 4A is a diagram of a heterogeneous nanothermite fuel;

FIG. 4B is a diagram of combustion of the nanothermite fuel in FIG. 4A;

FIG. 6 is a diagram of the electromagnetic spectrum showing wavelengths for wireless energy transmission;

FIGS. 19-20 are diagrams of wireless power transfer systems for charging airborne fleets of UAVs, according to several embodiments;

FIG. 23 is a diagram of recording wireless power and data transfer in a blockchain, according to an embodiment;

FIG. 31 is a diagram of aerial craft connectivity with smart city infrastructure for wireless power and data transmission, according to an embodiment.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

References herein to "fuel" and "metallic fuel" means recyclable metallic fuel (e.g., thermites), unless stated otherwise. References herein to "secondary fuel" means a fuel other than recyclable metallic fuel (e.g., hydrocarbons).

The systems and methods described herein utilize a thermal (heat) engine. Heat engines include non-combustion engines (e.g., steam engines in nuclear power plants) and combustion engines. Combustion engines include internal combustion engines, external combustion engines and air-breathing engines (e.g., rocket engines). Both internal combustion and external combustion engines may be categorized as rotary or reciprocating engines. Internal combustion rotary engines include open-cycle gas turbines and Wankel engines. External combustion rotary engines include closed-cycle gas turbines and steam engines. Internal combustion reciprocating engines include gas engines and diesel engines. External combustion reciprocating engines include Stirling engines and steam engines.

Heat engines may also be classified according to: stroke cycle operation (e.g., four stroke cycle or two stroke cycle); ignition type (e.g., spark ignition, compression ignition, laser ignition, induction, or a hybrid ignition using a combination of the aforementioned types); cooling (e.g., air cooled, water cooled, or hybrid cooling with use of metallic fuel); valve mechanism (e.g., overhead valves or overhead cams); and cylinder arrangement (e.g., in-line, V-type, horizontally opposed or horizontally mounted).

Generally, the heat engines described herein may be of any of the above engine types but configured specifically for combustion of recyclable metallic fuels and secondary fuels (e.g., hydrocarbons), such as the thrust engine disclosed in WO2020049528 having a priority date of Sep. 6, 2018 and to the same applicant, which is incorporated by reference herein, in its entirety. The heat engines described herein may be implemented in a variety of transport vehicles to provide power and propulsion. Transport vehicles incorporating a heat engine may include, but are not limited to, land vehicles (e.g., cars, motorcycles, trucks, busses, mobile homes, trains), aerial vehicles (e.g., planes, helicopters, balloons, airships/blimps, drones), water vehicles (e.g., ships, submarines) and spacecraft (e.g., rockets, satellites).

Figure 1A:
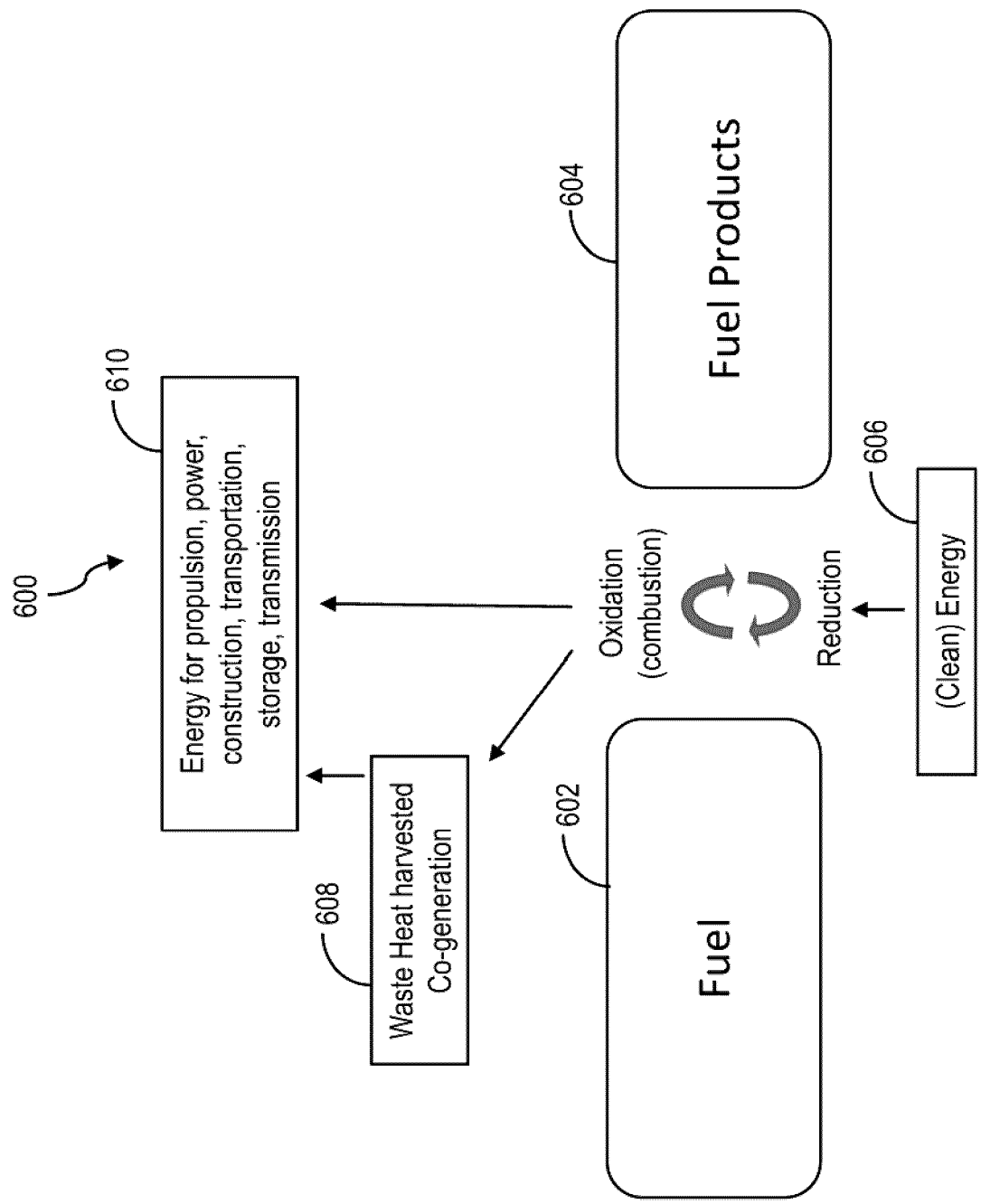
FIG. 1A is diagram of fuel recycling for power and propulsion, according to an embodiment.

Referring to FIG. 1A, shown therein is a diagram of fuel recycling 600 for power and propulsion. A fuel 602 is heated/combusted (oxidized) to generate energy 610 for propulsion, power, storage or transmission (dispatchable power) and waste heat 608 may be harvested to co-generate further energy 610. Fuel products 604 generated by oxidation of the fuel 602 are captured and recycled back into usable fuel 602 by reduction. Reduction of fuel products 604 requires an input of energy 606. It may be particularly advantageous to use terrestrial renewable energy sources to provide the input of energy 106 required for reduction of the fuel products 604.

The fuel recycling 600 shown in FIG. 1A may be adapted for use in vehicles. According to an embodiment, the fuel 602 (e.g., a nanothermite) is heated and/or combusted in a heat engine to provide thrust or propulsion. According to another embodiment, the fuel 602 is heated and/or combusted to heat a working fluid within an electrical and/or thermal power generation system, and power may be generated for energy distribution. According to other embodiments, the fuel 602 is heated and/or combusted to synthesize/produce fuel by products (e.g., metal and metal oxides) which may be used for transportation, manufacturing of other byproducts and/or storage (FIG. 1C).

Figure 1B:
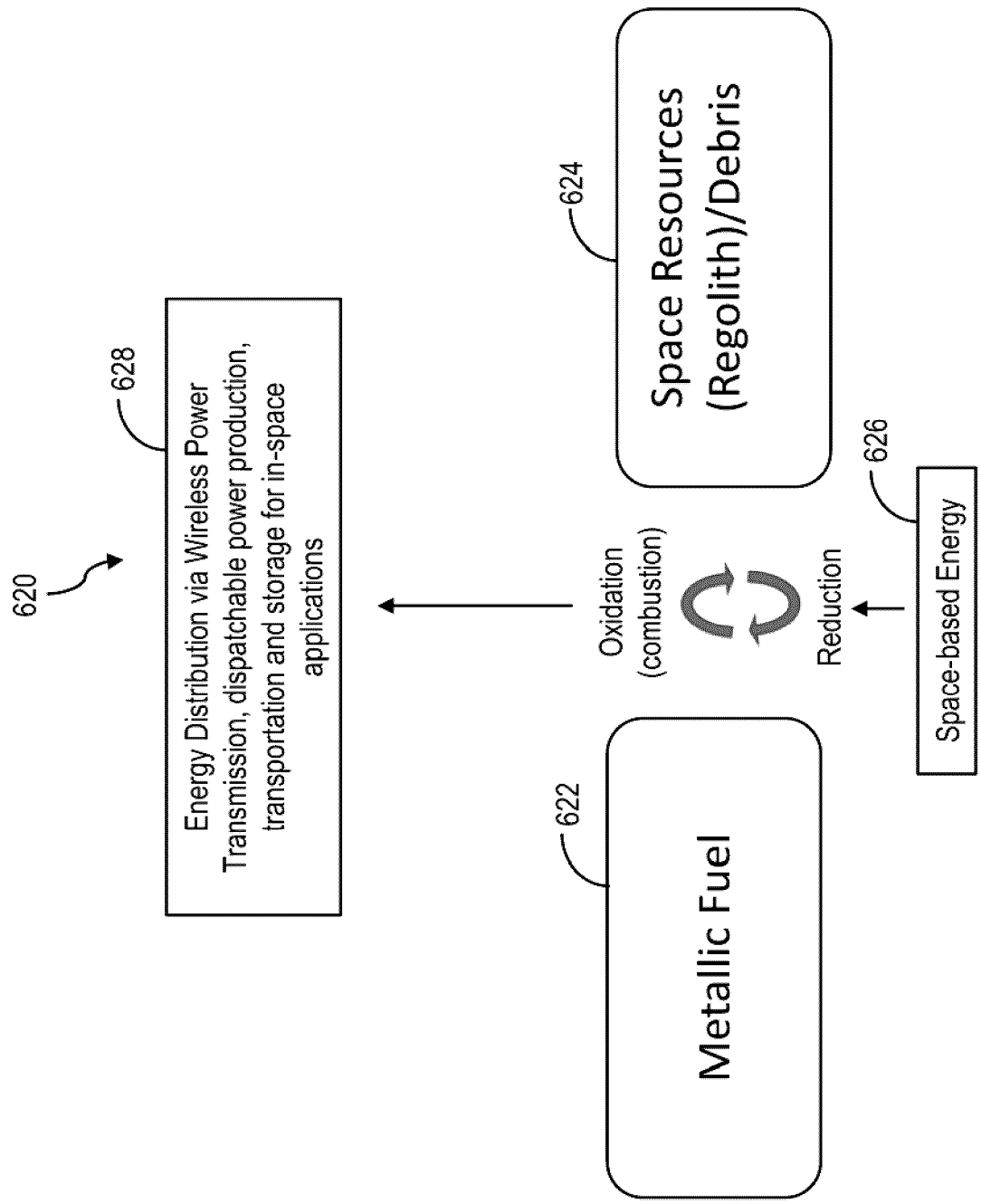
FIG. 1B is a diagram of in-space fuel recycling, according to an embodiment.

Referring to FIG. 1B, shown therein is a diagram of in-space fuel recycling 620. A metallic fuel 622 (e.g., a nanothermite) may be burned to provide propulsion of spacecraft (rockets, non-rocket launch systems e.g., balloons, impulse drivers, or other satellite propulsion systems, etc.) and generate energy 628 for in-space applications. The metallic 622 fuel may be synthesized from in-space resources (regolith) and or space debris 624 using an input of space-based energy 626. It may be particularly advantageous to use solar energy in space, and/or solar power satellites wherein wireless power transmission and/or power beaming are coupled to renewable energy sources to provide the input of energy 626 required for in-space reduction of space resources/debris 624. For example, energy (electromagnetic radiation) may be beamed from earth to space to power in-space fuel recycling 620 using systems and methods for wireless power transmission, as disclosed in PCT/CA2021/050985 filed Jul. 15, 2021 and having a priority date of Jul. 15, 2020 and to the same applicant, which is incorporated by reference herein, in its entirety. In-situ resource utilization (ISRU) may also be employed to harvest regolith 624 in-space which is then transformed for in-space metallic fuel synthesis and recycling. Space debris 624 may also be recycled and turned into metallic fuels 622 and other useful byproducts using the systems and methods described. The metallic fuels 622 may be transported for use and distribution at other locations and/or stored for later use.

Figure 1C:
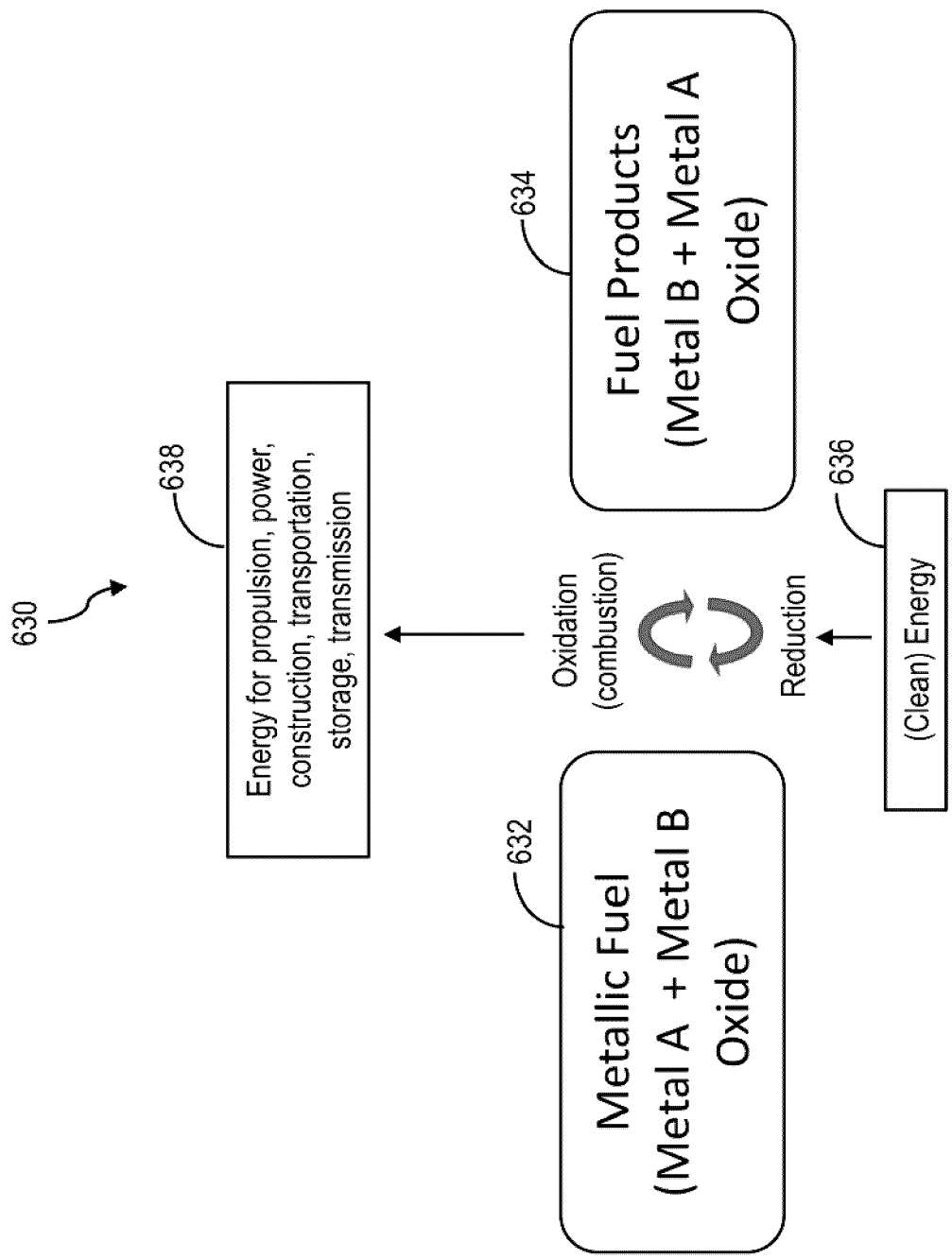
FIG. 1C is a diagram of fuel recycling to produce useful byproducts, according to an embodiment.

Referring to FIG. 1C, fuel products 634 may be captured, transported and/or recycled. Reduction of the fuel products 634 to generate recyclable metallic fuel 632 can be achieved through known processes such as carbothermal reduction, methanation and electrolysis (see FIG. 1D). Other processes may also be used such as hydrogenation to produce other useful "byproducts." For example, the "Metal A Oxide" fuel product 634 may be recycled and used in other applications such as additive manufacturing, or it can be reduced into metallic fuel 632 by a process that creates other useful "byproducts" including, but not limited to hydrogen, methane, water, oxygen, or the like (see FIG. 1E) which can be stored for other applications. Similarly, the "Metal B" fuel product 634 is itself a metallic fuel which can be further oxidized using air or water or another oxidizer for energy and power production. It should be noted that "Metal A" and "Metal B" may be different metals, or may be same metal having different oxidation states (i.e., varying valency).

Figure 2:
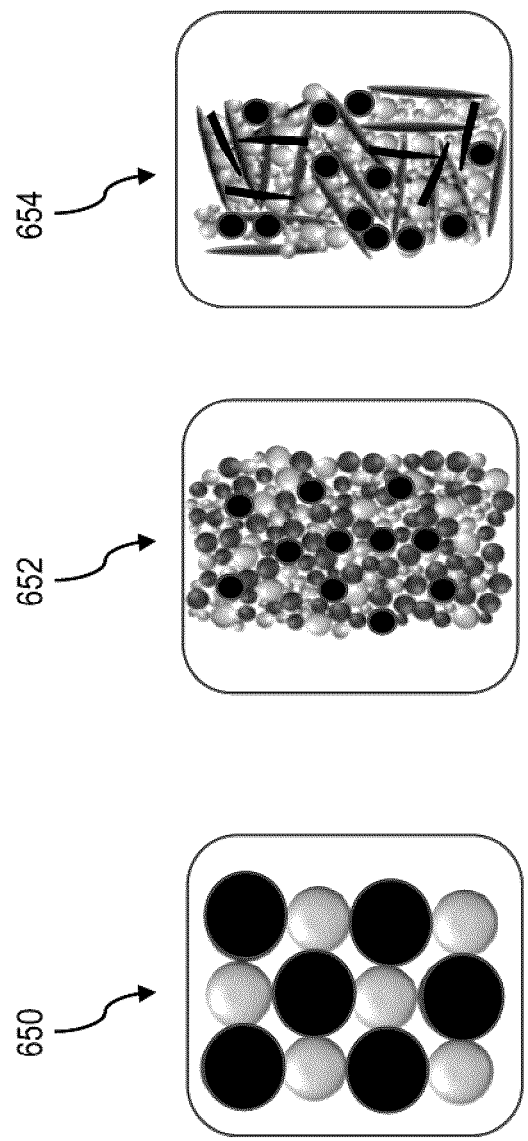
FIG. 2 is diagrams of exemplary thermites.
Figure 3:
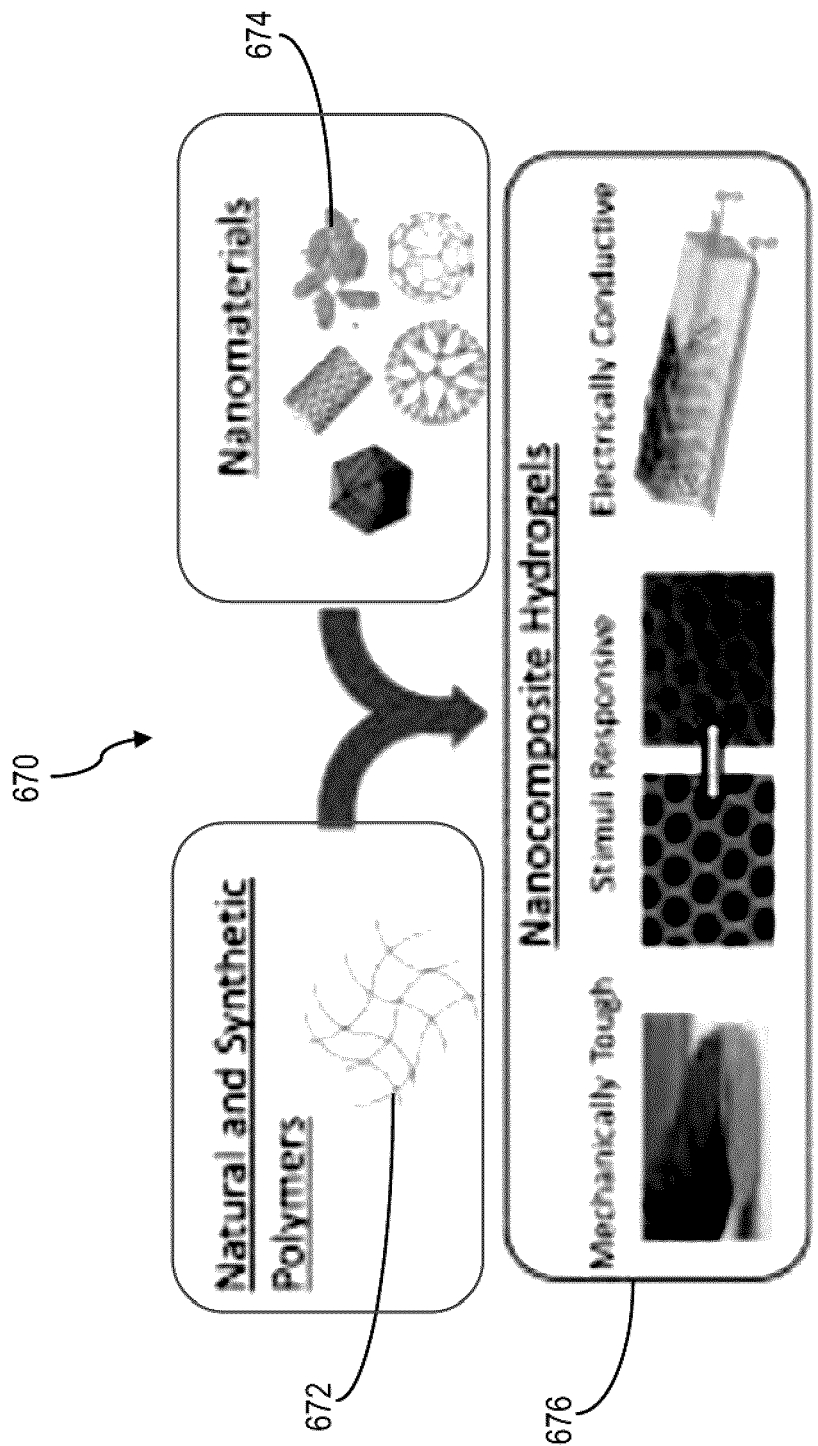
FIG. 3 is a diagram of nanocomposite hydrogel synthesis.

Fuel 602 sources may include one or more of: reactive metal compounds (e.g., thermites, microthermites, nanothermites) (FIG. 2); materials with magnetic properties; a mixture of layers of metals; multicoated metals with metamaterials (FIGS. 4A, 4B); hybrid mixtures of reactive metal compounds in liquid and inert states; in-situ space resources (e.g., regolith); ceramic precursors; conductive pastes; natural and synthetic fibers (FIG. 3); and hydrogels (FIG. 3). Fuel 602 sources may be in solid (powdered), liquid, or gaseous state.

Other fuel sources many include thermoplastics and/or other terrestrial waste products, such as cellulosics (e.g., toys, lamp shades, partition, shelf covers, storage boxes, ice crushers, juicer bowls, vacuum parts, tool handles, pipes, eyeglass frames), nylon (e.g., slide fasteners, combs, brushes and bristles, baby dishes, funnels, salad spoon and fork, washer gaskets), polyethylene (squeeze bottles, ice trays, toys, storage boxes, flashlights, wiring, pipes, kitchenware (film or coating, semi-rigid, rigid), vinyl (raincoats, upholstery, tiles, inflatable curtains, toys, luggage, baby clothes, records (film, sheeting, semi-rigid, rigid, coating), acrylic (bowls, trays, partitions, roofing, handbags, eyeglasses, light fixtures, table appointments, bookends, dresser sets, window glazing, picture frames), or the like.

The fuel 602 may be synthesized from one or more fuel sources by hybrid synthesis methods, including: additive manufacturing, physical mixing, chemical reactions, emissive and missive methods, vapor deposition, pyrolysism microwave-assisted synthesis, ball milling, exfoliation, sonochemical techniques, arc-discharge, or a combination thereof.

The fuel 602 may be heterogeneous having two or more components with distinct properties, for example, hard metallic particulates and a soft binder for cohesion and flow. Heterogenous fuel 602 may beneficially provide a large contact surface area and internal/external frictional resistance to flow. Heterogeneous fuel 602 may include particles of different length and size scales.

Referring to FIG. 2, shown therein are exemplary thermites 650, 652, 654. Thermites 650, 652, 654 are a metastable intermolecular composite made up of a fuel, typically a metal (shown in dark shading), and an oxidizer, typically a metal oxide (shown in light shading). As the thermite 650, 652, 654 includes both the oxidizer and metal fuel, the energy released per unit mass is very large. Thermite particles can range in size from a microthermite 650 on the scale of hundreds of micrometers to a nanothermite 652 on the scale of 100 nanometers of less. Nanometer-scale ordered thermite 654 is another variant.

Referring to FIG. 3, shown therein is a diagram of nanocomposite hydrogel synthesis 670. Natural or synthetic polymer sources 672 are combined with nanomaterials 674 (e.g., nanothermites) to produce nanocomposite hydrogels 676. The resulting hydrogel 676 is mechanically strong, electrically conductive and responsive to stimuli. The hydrogel 676 may be synthesized as a simple linear-chain structure or a crosslinked structure.

Referring to FIG. 4A, shown therein is a diagram of a heterogeneous fuel 700. The heterogenous fuel 700 may be the fuel 602 in FIG. 1A or metallic fuel 632 in FIG. 1C. The fuel 700 includes a nanothermite particle 702 composed of 2× $Al/Fe_2O_3$ particles. The nanothermite particle 702 is wrapped in a binder 704 in a core-shell arrangement. The binder 704 may be a hydrogel (e.g., hydrogel 676) or a metamaterial (e.g., a self-assembled nanomaterial, nanocarrier nanowires, aerogels, or the like). The composition of the binder 704 may be application specific.

The fuel 700 may be burned/combusted in a thermal power plant or heat engine. As shown in FIG. 4B, an input of thermal energy causes the nanothermite particle 702 to heat or combust into individual thermite particles 706 and release thermal energy, which can propagate further combustion. The heat generated, may be converted to electric power through heat transfer and/or inductive heating. "Waste" heat may also be harvested and turned into electricity, using for example, with one or more of the following: thermionic emission, thermophotovoltaic, and or thermoelectric device or the like.

Combustion of metallic fuels produce a solid-phase fuel product. For example, in nanothermite coreshell combustion, an Aluminum/Iron Oxide coreshell is combusted producing Aluminum Oxide ($Al_2O_3$) and Iron. The Aluminum Oxide and Iron may be captured and recycled for reuse. The Aluminum Oxide may be used to additively manufacture useful products, whereas the Iron is oxidized further and used as a metal fuel, where its metal oxide products may be further captured and recycled as fuel. The captured byproducts may be recycled using renewable terrestrial energy, stored energy, energy harvested from the environment (i.e., solar) or using energy received from wireless power transmission systems.

Capturing of fuel products for storage, and recycling may be achieved using known capture techniques adapted for use on Earth and in Space. For example, on Earth, the metal oxide and the metal fuel products may be captured by gravity-separation in a reaction vessel. In space (a zero-gravity environment), the metal oxide and the metal fuel products may be mixed with an inert carrier fluid in the reaction chamber and magnetohydrodynamic separation may be performed to capture the fuel products according to charge.

Figure 5:
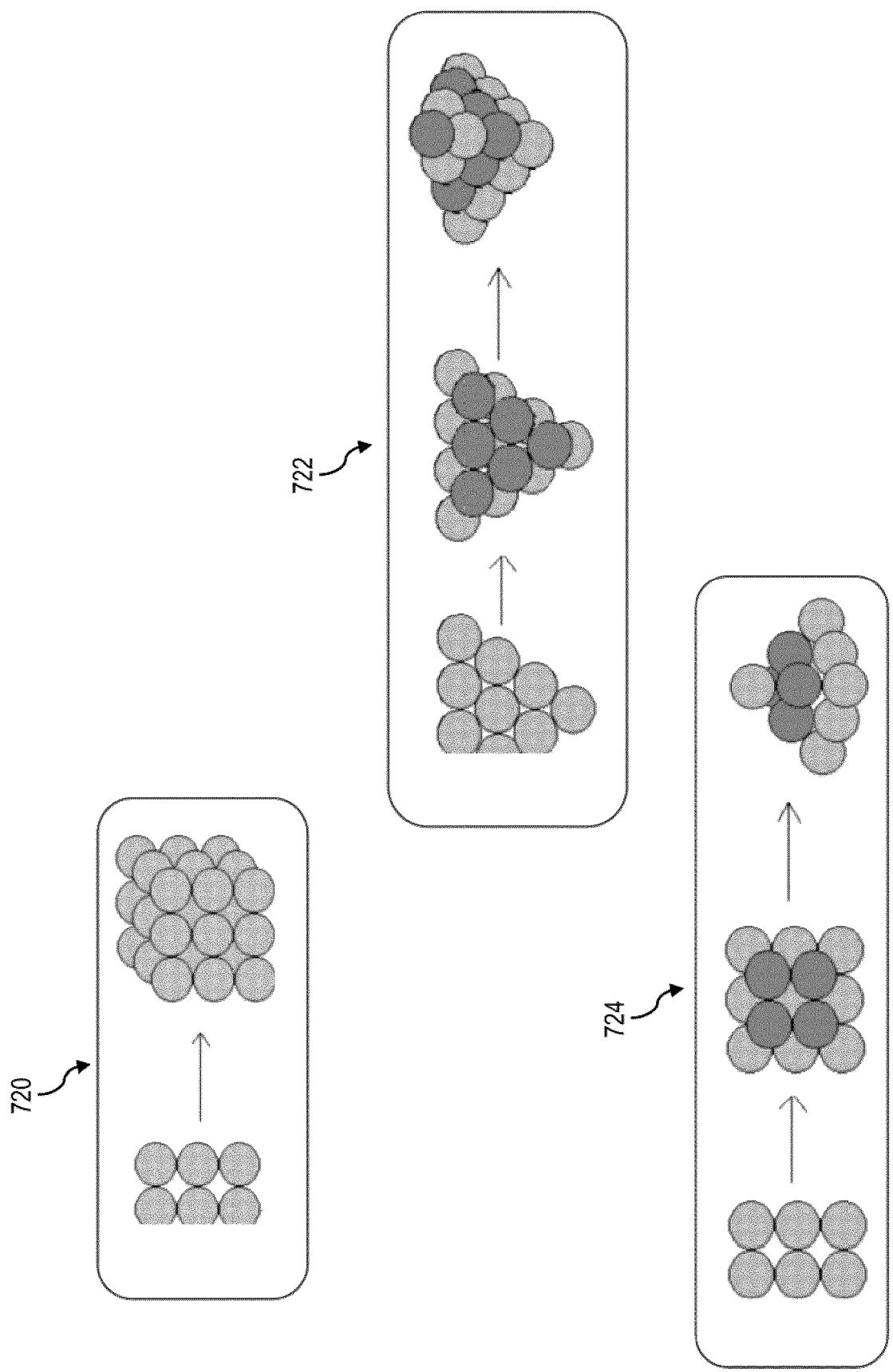
FIG. 5 is diagrams of packing configurations for fuel particles.

Referring to FIG. 5, shown therein are packing configurations 720, 722, 724 for fuel particles. Each ball (light and dark shading) represents a fuel particle. The fuel particles may be a heterogeneous fuel 700 or composite fuel particle 702. The fuel particles may be arranged in a simple cubic packing 720, a face-centred cubic packing 722, or a hexagonal packing 724. Other configurations, for example, wires, cones, spheres, torus, cylinder, cuboid, prisms, dodecahedron, icosahedrons, pyramids, or the like, are also contemplated. Depending on the application for the fuel, a particular packing configuration may be selected. A specific application may also dictate the shape, size, surface charge, surface area, surface functionally, porosity, size distribution, structure and composition of the fuel particles.

Packing of fuel particles may also provide for catalyst-based controlled release systems, wherein a catalyst is included with the fuel. The catalyst may be combined with fuel particles as a conjugate, as a matrix-based, or a membrane-based system that is stimuli-responsive, being chemically, mechanically, magnetically, or thermally activatable. The catalyst may also be self-activatable/excitable. A catalyst may be added to fuel particles by grafting, coating or layering methods.

Referring to FIG. 6, shown therein is a diagram of the electromagnetic spectrum showing wavelengths of electromagnetic radiation 750 for wireless energy transmission for aeronautical and astronomical applications. The aeronautical application range 752 includes extremely low frequency (ELF), very low frequency (VLF), microwave, infrared, visible light and ultraviolet radiation. The astronomical application range 754 includes the wavelengths in the aeronautical application range 752 as well as x-ray, gamma and cosmic radiation. Types of radiation that are present in both the aeronautical application range 752 and the astronomical application range 754, for example microwave radiation, may be used for combined aeronautical and astronomical applications such as ground-to-space (and space-to-ground) wireless energy transmission.

In-space applications of wireless power transmission as described herein may include directing power for recharging of space systems (i.e., satellite systems), constellation of satellites in orbit and surface operations of moon bases, rovers, drones, exploration vehicles, space architecture and other lunar structures or the like. Aspects of systems may be used for surface and subsurface operations. Aspects of systems described herein may be used to create a point-to-point network for wireless power and data transfer on bodies such as the Moon, Mars, asteroids, and Earth. Bodies may be orbited by a craft, such as a satellite that may communicate with devices or ground stations present on the surface of each body, such as to enable a large-scale wireless power and data transfer network, accessible on the surface and in the orbit of each body.

Metallic fuels may be used to power satellite propulsion systems (SPS) for maneuvers and station-keeping in a plurality of space applications including around the Earth, cislunar space, the Moon, Mars, and or other celestial bodies. Furthermore, metallic fuels may be used to generate electrical energy to power satellite on-board avionics, electronics, rectennas, solar panel deployment/realignment, and other mission-related instruments.

Figures 1D, 1E:
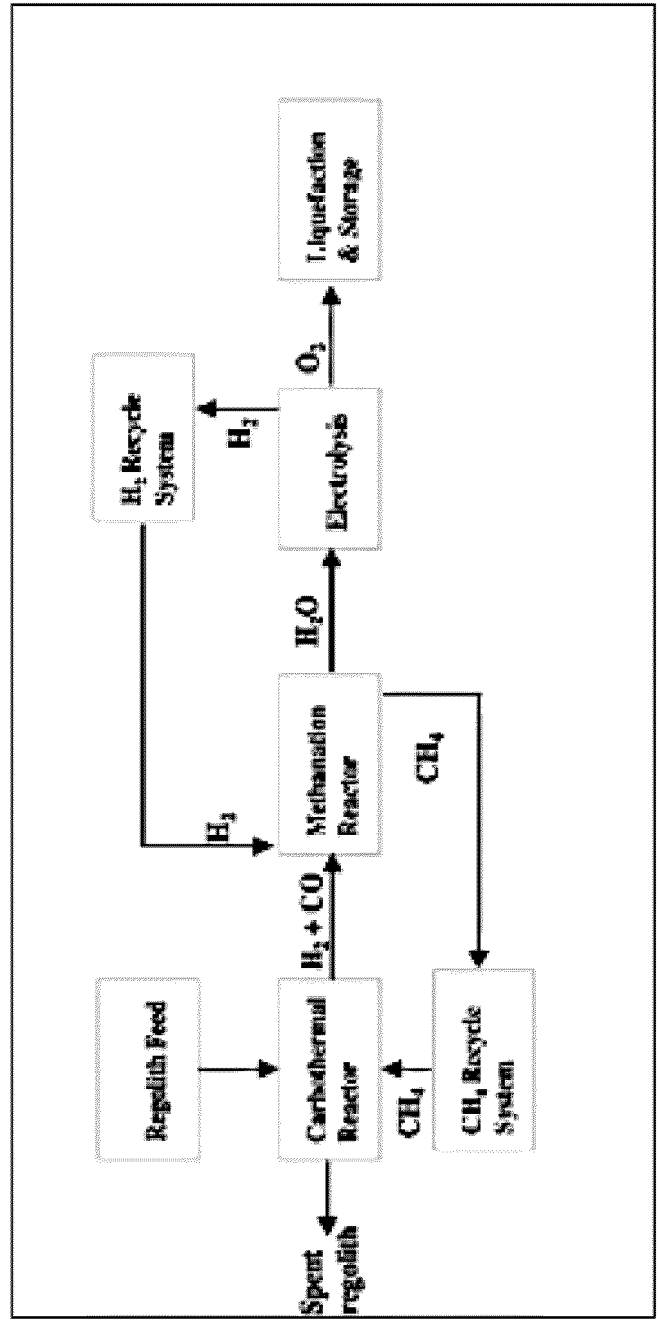
FIG. 1D is chemical equations for reductive processes.
FIG. 1E is a diagram of in-situ (in-space) resource utilization process for regolith synthesis and transformation.

Each satellite has a wireless power receiving/transmitting system such as those disclosed in PCT/CA2021/050985. The satellite may receive power wirelessly beamed up from a surface-based power generation source or a stored power source to power the satellite, recharge batteries and/or recycle captured metallic fuel byproducts into usable metallic fuel using one or more fuel reduction processes (FIG. 1D). Furthermore, the satellite may wirelessly beam power generated by combustion of metallic fuel to vehicles 338 or buildings on the surface or to another satellite.

A fleet (constellation) of satellites having wireless power systems may thus dynamically recycle fuel to recharge one another as needed. This may be particularly advantageous for free space satellite propulsion systems where other sources of power are unavailable. Similarly, a constellation of satellites in low-earth orbit, middle earth orbit or sunsynchronous orbit, other high orbits, geosynchronous earth orbit or other orbits around earth orbit may dynamically receive/transmit wireless power to recharge and/or recycle fuel without having to break orbit.

Figure 7:
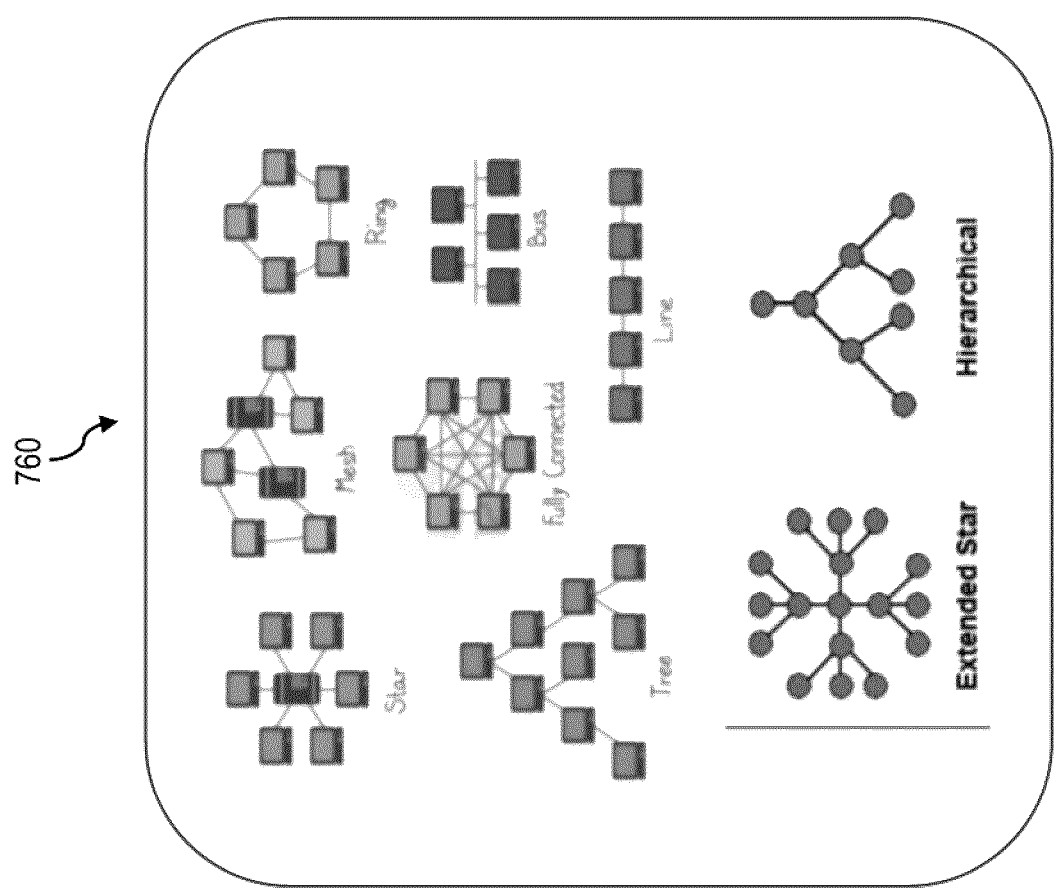
FIG. 7 a diagram of power and data network topologies for wirelessly powering a three-dimensional array of vehicles, according to several embodiments.

Referring to FIG. 7, shown therein is a diagram of power and data network topologies 760 for powering a three-dimensional array of vehicles, that could be continuous like a crystalline structure, or random like a flock of birds. The vehicles may be land vehicles, water vehicles, drones, or other aerial craft, satellites, or spacecraft, hereafter referred to as nodes. The nodes may be fixed, mobile or hybrid systems including tethered systems having tethered components on the ground and in the air; or having tethered components in the air and in space; or "tug" systems of the type disclosed in PCT/CA2021/051885 filed Dec. 23, 2021 and having a priority date of Dec. 23, 2020 and to the same applicant, which is incorporated by reference herein, in its entirety. The nodes may transmit and receive power wirelessly and store the power. Charging a distributed array of nodes may be done using one or more of the network topologies 760 shown. Charing power may occur by transferring power from a power source to a node; then node to node (i.e., a power relay system) to dynamically manage power systems to optimize stored energy amongst nodes. Metallic fuels may be transported to a plurality of nodes for power generation and distribution to manage and optimize the power distribution network 760.

Figure 8:
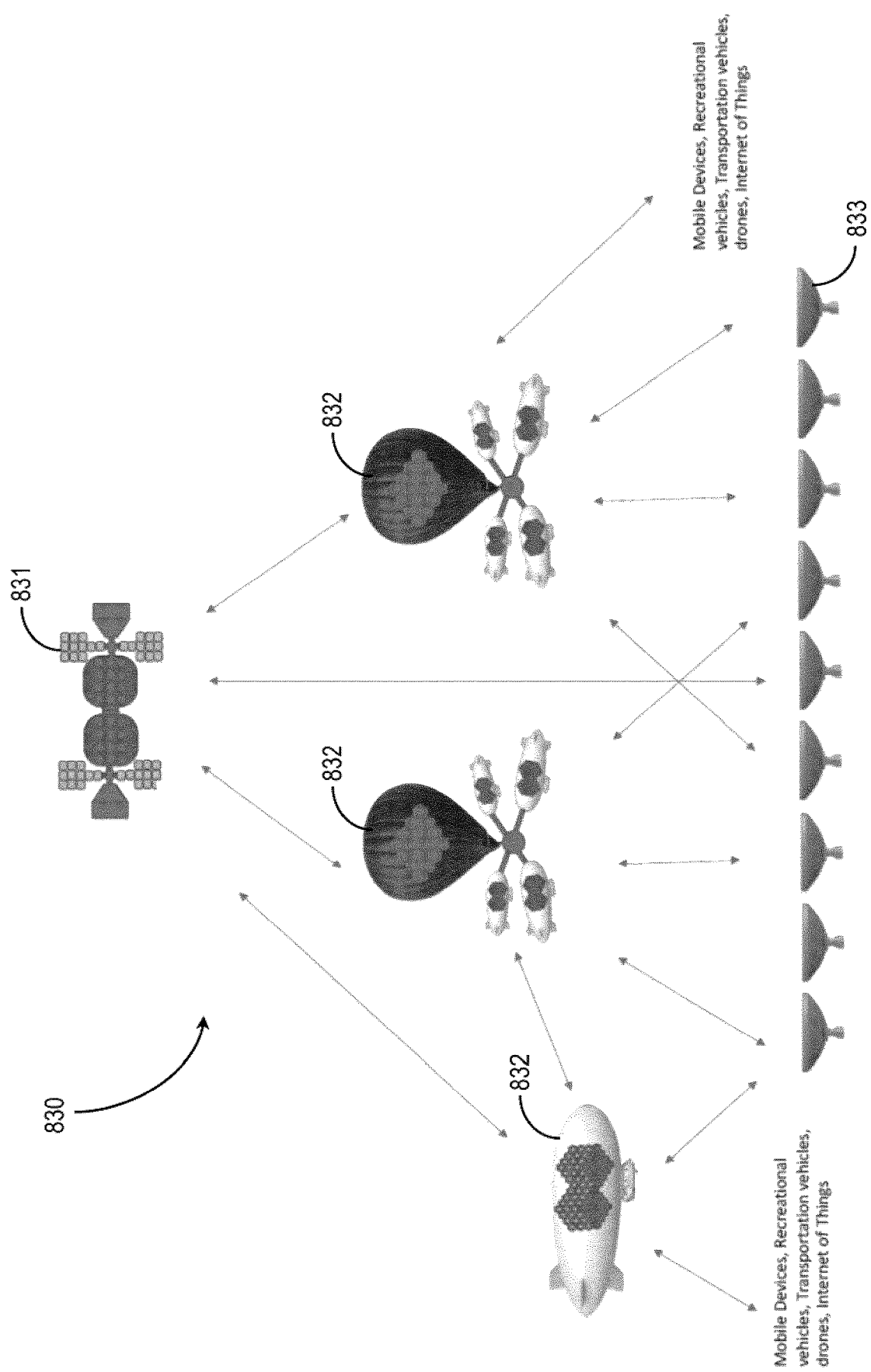
FIG. 8 is a diagram of a deployable data hub system for use in point-to-point data transmission, according to an embodiment.

Referring to FIG. 8, shown therein is a diagram of a deployable data hub system 830 for use in point-to-point data transmission, according to an embodiment. The system 830 includes a constellation of satellites 831, a fleet of aerial craft 832 and ground stations 833. The satellites 831 include a heat engine to combust metallic fuel for propulsion and provide energy to power onboard systems.

In conventional systems wherein data is beamed directly from satellites 831 to ground stations 833, the satellite 831 must be in range (i.e., above the ground station 833) for successful data transmission. Compared to conventional systems, the system 830 is advantageous to provide an intermediary data hub in the fleet of aerial craft 832 to relay signals between the satellite 831 and the ground stations 833. Accordingly, a satellite 431 need not be in direct range of a ground station 833 for successful data transmission and may transmit or receive data via the aerial craft 832 data hub. A further advantage is that data received from the satellite 831 may be transmitted directly from the aerial craft 832 data hub to IoT devices, vehicles, drones, etc. rather than having to pass through a ground station 833 first.

Figure 9:
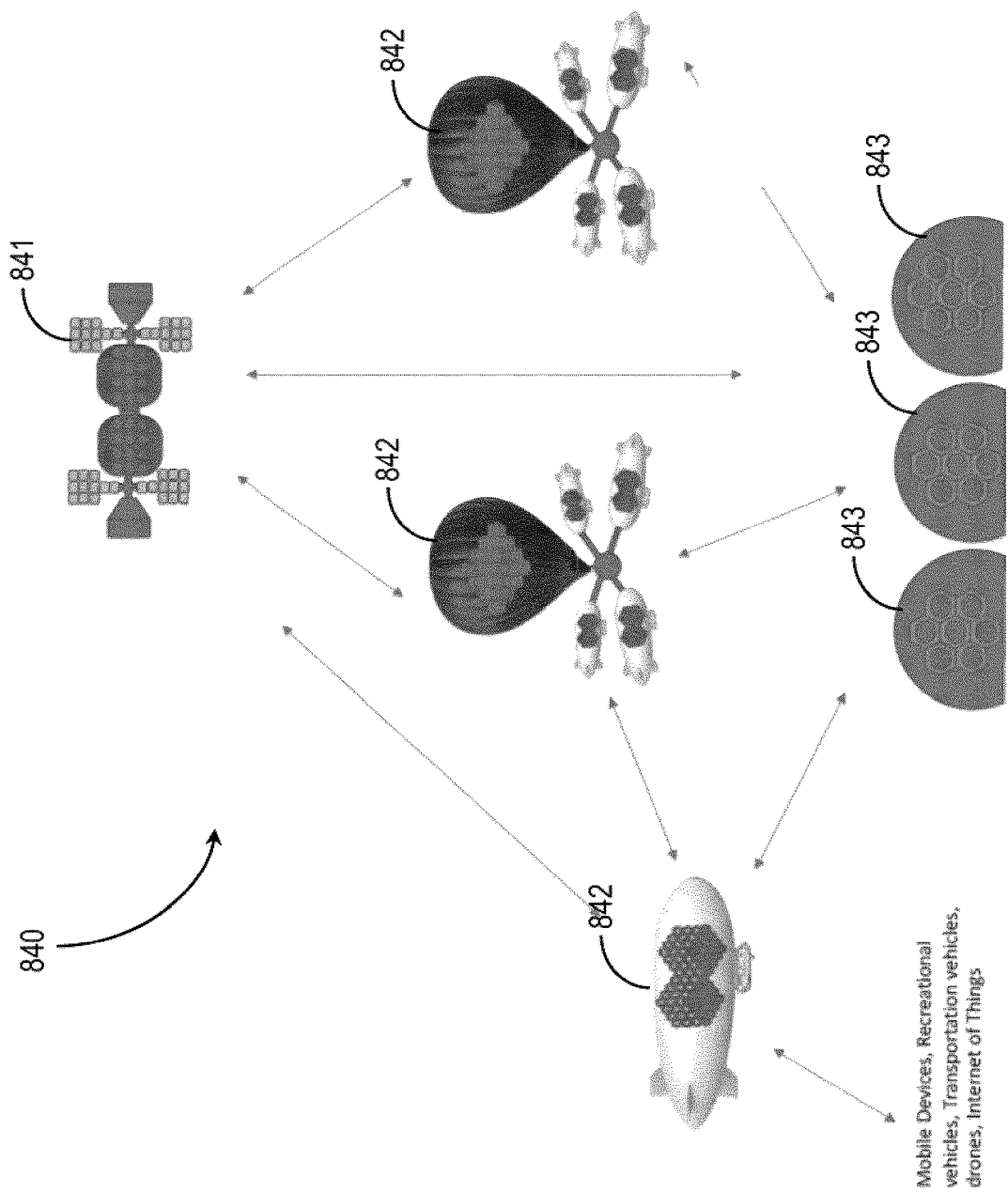
FIG. 9 is a diagram of a rapidly deployable power hub system for use in point-to-point wireless power transmission, according to an embodiment.

Referring to FIG. 9, shown therein is a diagram of a rapidly deployable power hub system 840 for use in point-to-point wireless power transmission, according to an embodiment. The system 840 includes a constellation of satellites 841, a fleet of aerial craft 842 and deployable ground stations 843. The satellites 841 include a heat engine to combust metallic fuel for propulsion and provide energy to power onboard systems. The satellites 841 include transmitters to beam EM radiation down toward the earth from the power generated by the combustion of metallic fuel. The fleet of aerial craft 842 are positioned or tethered at an intermediate altitude between the satellite 841 and ground stations 843. The aerial craft 842 include arrays of EM radiation transmitters and receivers (including rectennas). The aerial craft 842 receive the radiation beamed down from the satellite 841 and retransmit the radiation downward toward the earth.

The deployable ground stations 843 may be additively manufactured, deployable structures to house personnel, and other materials. The deployable ground stations 843 include arrays of rectennas to collect the radiation beamed downward from the aerial craft 842. The deployable ground stations 843 are preferable dome shaped to provide maximal area for deployment of the arrays of rectennas to receive beamed radiation from the aerial craft. The system 840 may be advantageously used to generate power in remote areas where power availability is low or when a local electrical grid is down. Alternatively, the system 840 may be used to augment available energy.

It should be noted that the systems shown in FIGS. 7-9 may be implemented for ground-to-space or space-to-ground power and data transmission on any planetary or astronomical body of sufficient size, including, but not limited to the Earth, the Moon, Mars, and asteroids. In addition, in embodiments wherein energy is transmitted from the ground up to satellites, a ground thermal power plant may combust metallic fuel to generate power which is transmitted upward.

Figure 10:
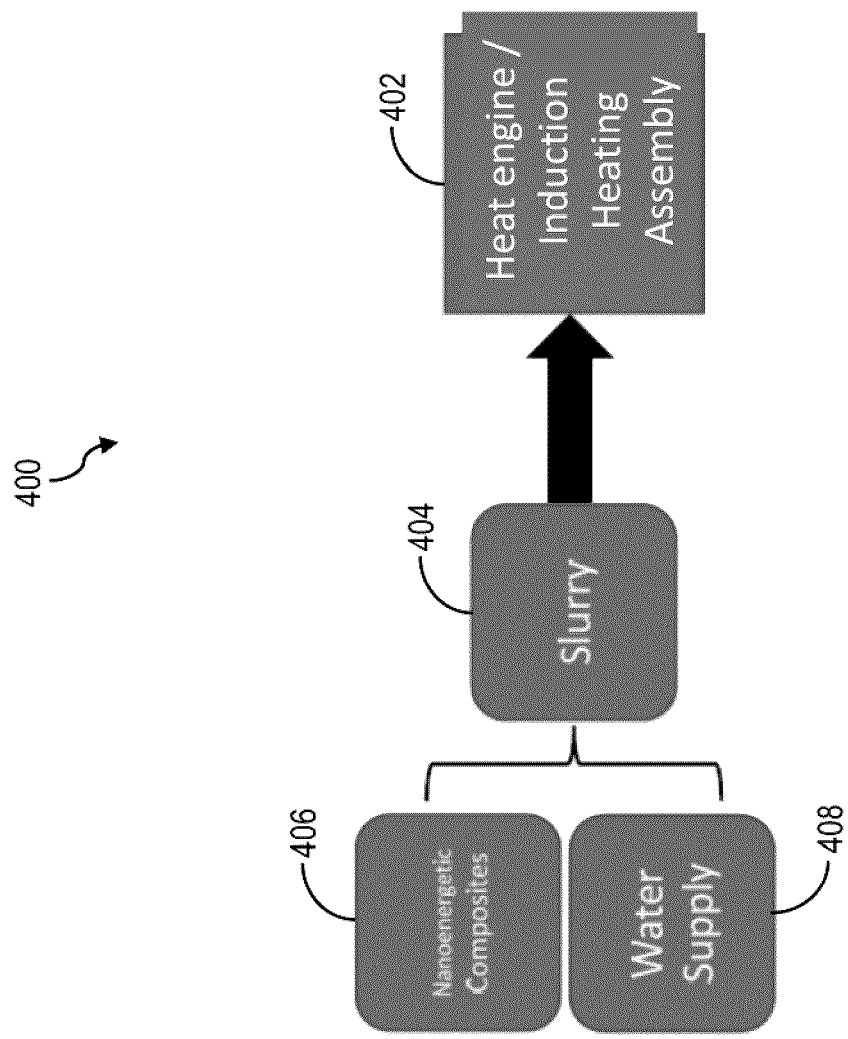
FIG. 10 is a diagram of a boiler ground-based system, according to an embodiment.

Referring to FIG. 10, shown therein is a diagram of a ground-based recyclable fuel system 400, according to an embodiment. The system 400 may be implemented in a ground-based thermal power plant to generate power, or in a vehicle to generate power and propulsion. The system 400 includes a heat engine 402 for combusting metallic fuel 406 (e.g., nanothermites) to generate steam. The fuel 406 is stored in a tank and is mixed with water 408 to form a slurry 404 which is fed into the heat engine 402. The water 408 may act as a working fluid that retains the heat from the combustion of the fuel 406, which may then be used to drive the production of electricity or provide propulsion. According to some embodiments, the heat in the working fluid may be used to boil water and generate steam to drive a generator to produce electricity. According to other embodiments, the steam generated may drive a steam engine of a vehicle to provide propulsion.

The heat engine 402 includes an induction heating assembly for heating the slurry 404 to combust the fuel 406. For example, the induction heating assembly may produce eddy currents in the slurry 404 and heat the fuel 406. Once combustion of the fuel 406 commences, hysteresis may provide sufficient heat for continued combustion. Generally, a combination of induction heating and hysteresis may be used to ensure an appropriate amount of heat is maintained in the heat engine 402 for combustion. Other electromagnetic radiation such as microwave, ultrasonic, ultraviolet or lasers may be used to augment or tune the combustion in the heat engine 402.

In the heat engine 402, heat transfer to a working fluid may be caused by complete combustion of the fuel 406 or through convection by means of sintering, where the metallic fuel 406 is heated but does not reach combustion temperature. The heat engine 402 may employ a combustion/sintering process whereby fuel 406 is preheated by sintering and then transferred to a combustion chamber.

Full combustion of the fuel 406 may occur via multi-stage combustion, where the products of a first combustion become the reactants in a second combustion. Multi-stage combustion may be achieved by looping combustion reactions or looping sintering processes, or a combination of the two, as described below.

Convection from the sintering the fuel 406 may also transfer heat to a working fluid (i.e., water 408) to drive the production of electricity or to provide propulsion. Beneficially, sintering of the fuel 406, may provide sufficient heat to cause a phase change in the working fluid, without requiring complete combustion of the fuel 406. As such, the fuel 406 may be sintered to transfer heat by convention to the working fluid, then cooled and re-sintered in a loop to drive generation of electricity or to provide propulsion. The heat engine 402 may include multiple reaction chambers, where combustion of fuel 406 in a combustion chamber may be coupled to a sintering loop in a reaction chamber. Advantageously, the metallic fuel itself may be used as a coolant to regulate convection during sintering loops by introducing fresh "cool" metallic fuel into the reaction chamber, rather than using air, water or other means for cooling.

The system 400 may further include a thermal energy harvesting system (not shown) connected to the heat engine 402 to capture and convert excess heat or thermal energy into electricity directly (i.e., without use of a working fluid). The thermal energy harvesting system may include one or more of the following systems: thermophotovoltaic cells and or thermoelectric devices adjacent to around the heat engine 402, such as Peltier devices connected to the heat engine 402, and or use of thermionic emission.

Figure 11:
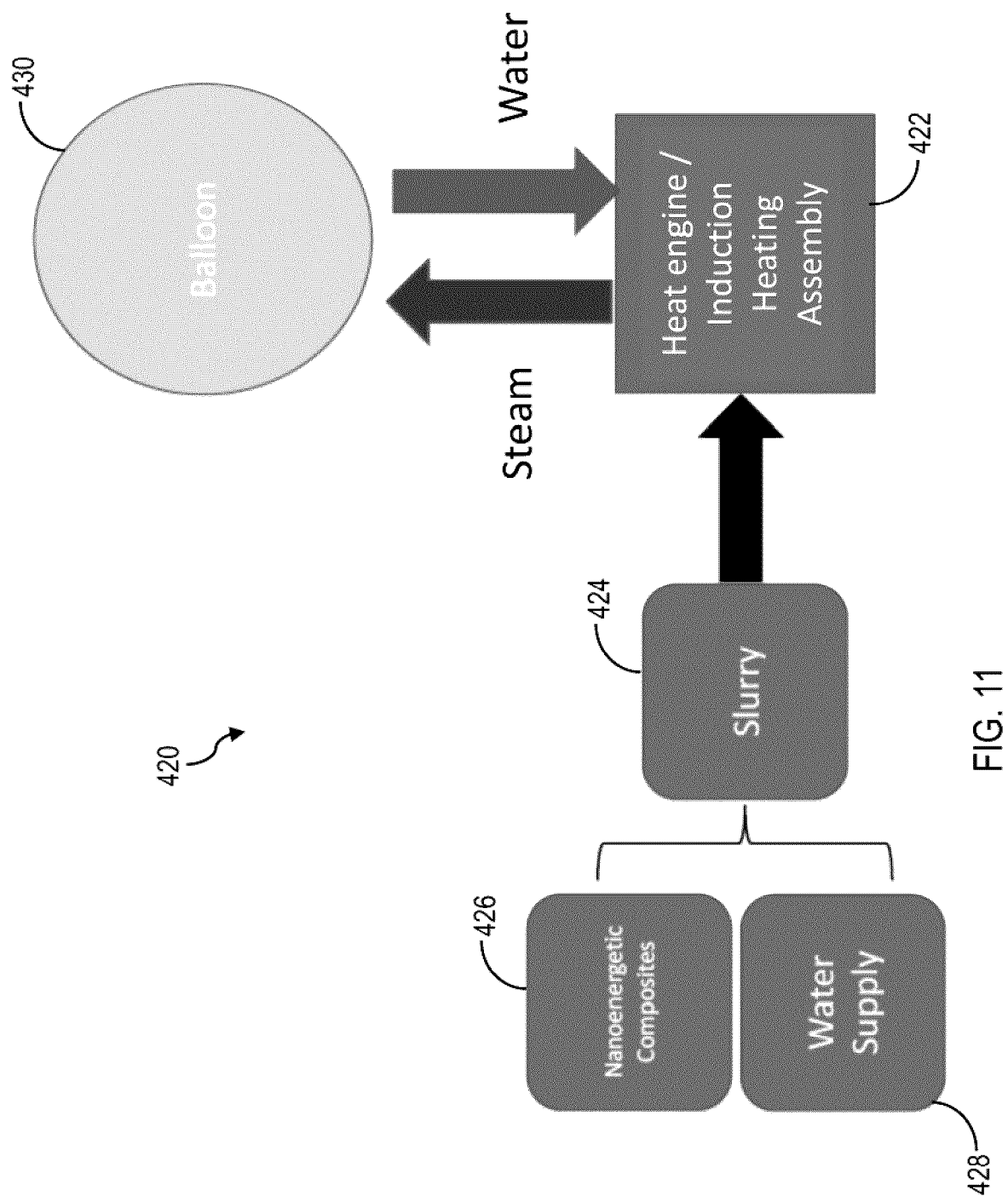
FIG. 11 is a diagram of a boiler in-flight system, according to an embodiment.

FIG. 11 is a diagram of an in-flight recyclable fuel system 420, according to an embodiment. The system 420 is substantially similar to the system 400 in FIG. 10, however the system 420 is operably connected to an aerial craft, for example, a balloon 430 to drive propulsion. The fuel 426, water 428, slurry 424 and heat engine 422 may be contained within a gondola of the balloon 430. Steam may be generated in a closed loop by the combustion and/or sintering of the fuel 426 and may be used to power propulsion of the balloon 430. When the steam cools, the condensed water drains down and may be captured for reuse. Metal-based materials may be used to harvest water to drive processes.

Generally, the systems 400, 420 shown in FIGS. 10 and 11, respectively, may be adapted for use in any vehicle, not limited to land vehicles, aerial vehicles, water vehicles and spacecraft. Furthermore, the systems 400, 420 may be implemented as a hybrid system that can use exclusively recyclable metallic fuel or use a combination of metallic fuel, as a primary fuel source, in combination with secondary fuels (e.g., hydrocarbons). In such a hybrid system, the heat engine 402 may be configured to combust a mixture of the metallic fuel and the secondary fuel for propulsion and/or to generate electricity to power onboard systems. Advantageously, the primary fuel is recyclable metallic fuel which does not contribute to greenhouse gases when combusted, and so harmful emissions from the hybrid system are greatly reduced in comparison to a conventional system/heat engine that burns solely hydrocarbons. A further advantage is that heat from combustion of the metallic fuel may be sufficient to ignite combustion of the secondary fuel, without further energy input.

The systems 400, 420 may also be integrated with conventional power and propulsion systems in gas, hybrid and electric vehicles. According to an embodiment, the heat engine 402 may be coupled to an electric motor and a battery in a hybrid or electric vehicle, whereby the excess (or waste) heat from the heat engine 402 is used to generate electricity stored in the battery. In another embodiment, the heat engine 402 may be coupled to a conventional gas turbine engine for propulsion and power generation. In yet another embodiment, the heat engine 402 may be coupled to a gas turbine and a battery, whereby excess heat from the engine(s) is used to generate electricity stored in the battery. Furthermore, regenerative braking may be included to help with energy recovery.

The systems 400, 420 may also be adapted for use in a vehicle to provide a mobile power generator for on-demand power to buildings when a local power grid is down. In such a configuration, the metallic fuel may be combusted in the heat engine 402 when power is needed on demand, and the fuel byproducts may be recycled back into metallic fuel, when power is not needed.

Figure 12:
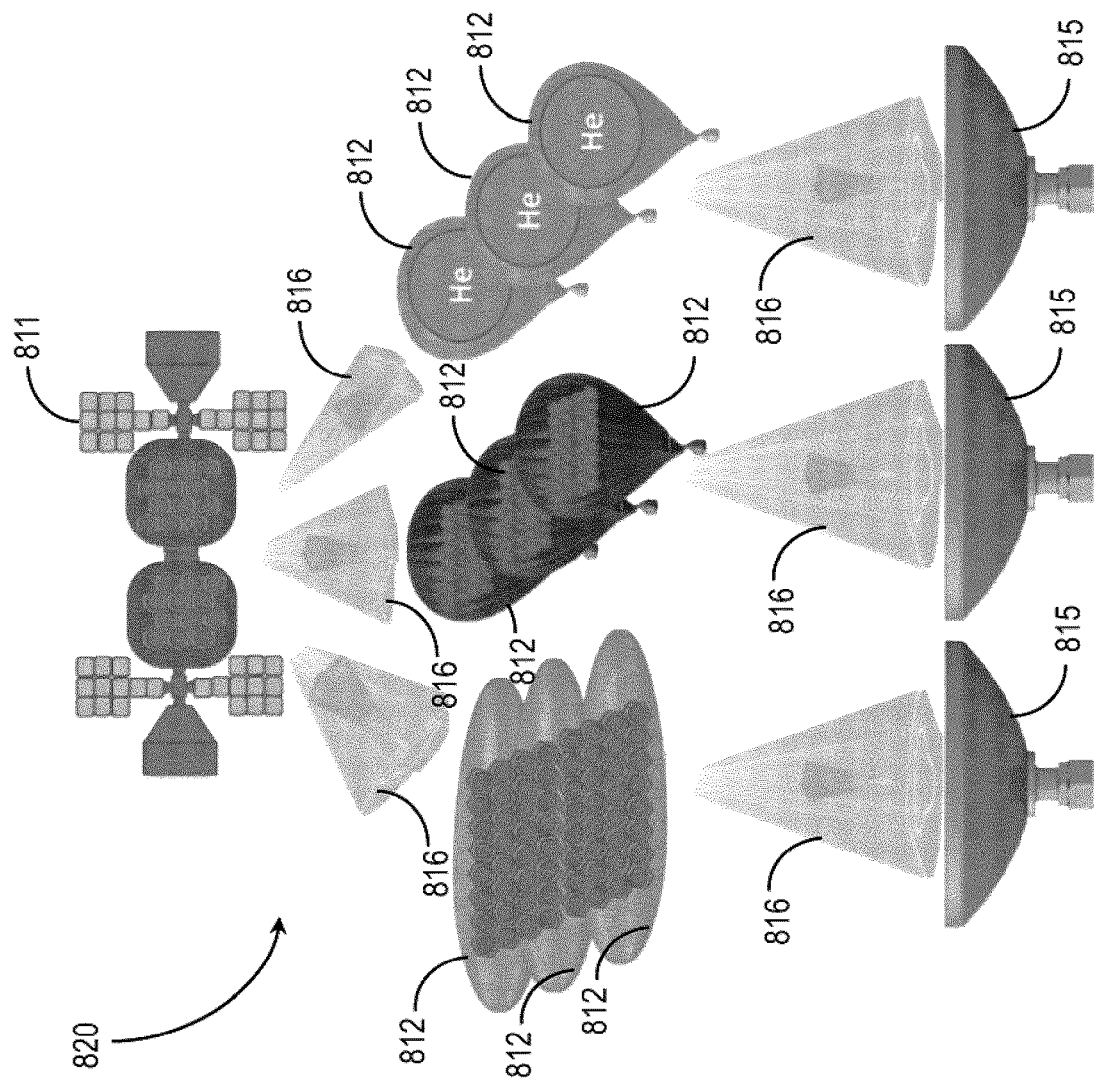
FIG. 12 a recyclable fuel powered space-to-earth wireless power and data transmission system, according to an embodiment.

Referring to FIG. 12, shown therein is a diagram of a recyclable fuel powered space-to-earth wireless power and data transmission system 820, according to an embodiment. The system 820 includes one or more satellites 811 in orbit. The satellites 811 include a heat engine to combust metallic fuel for propulsion and to generate electricity to power onboard systems.

The satellites 811 include transmitters to beam EM radiation 816 down toward the earth from the power generated by the solar cells. The system 820 includes one or more aerial craft 812 positioned or tethered at an intermediate altitude. The aerial craft 812 include arrays of EM radiation transmitters and receivers (including rectennas). The aerial craft 812 receive the radiation 816 beamed down from the satellite 811 and retransmit the radiation 816 downward toward the earth. The system 820 includes ground-based parabolic receivers 815 to collect the EM radiation 816 beamed down from the aerial craft 812. The parabolic receivers 815 may include rectenna arrays to convert the received radiation 816 to electricity for use on the ground.

Figure 13A:
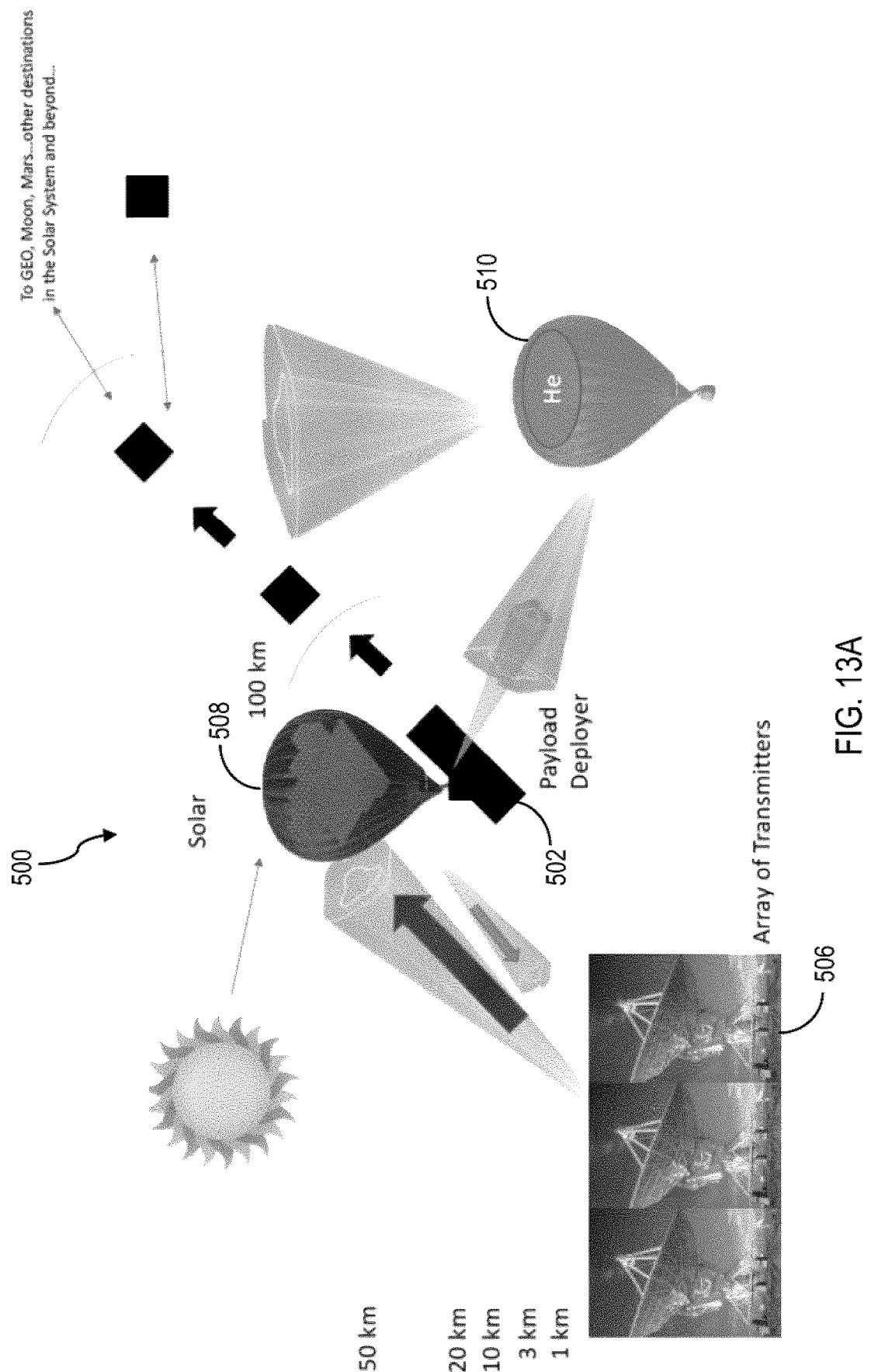
FIGS. 13A-13B are diagrams of a point-to-point payload transfer system, according to an embodiment.
Figure 13B:
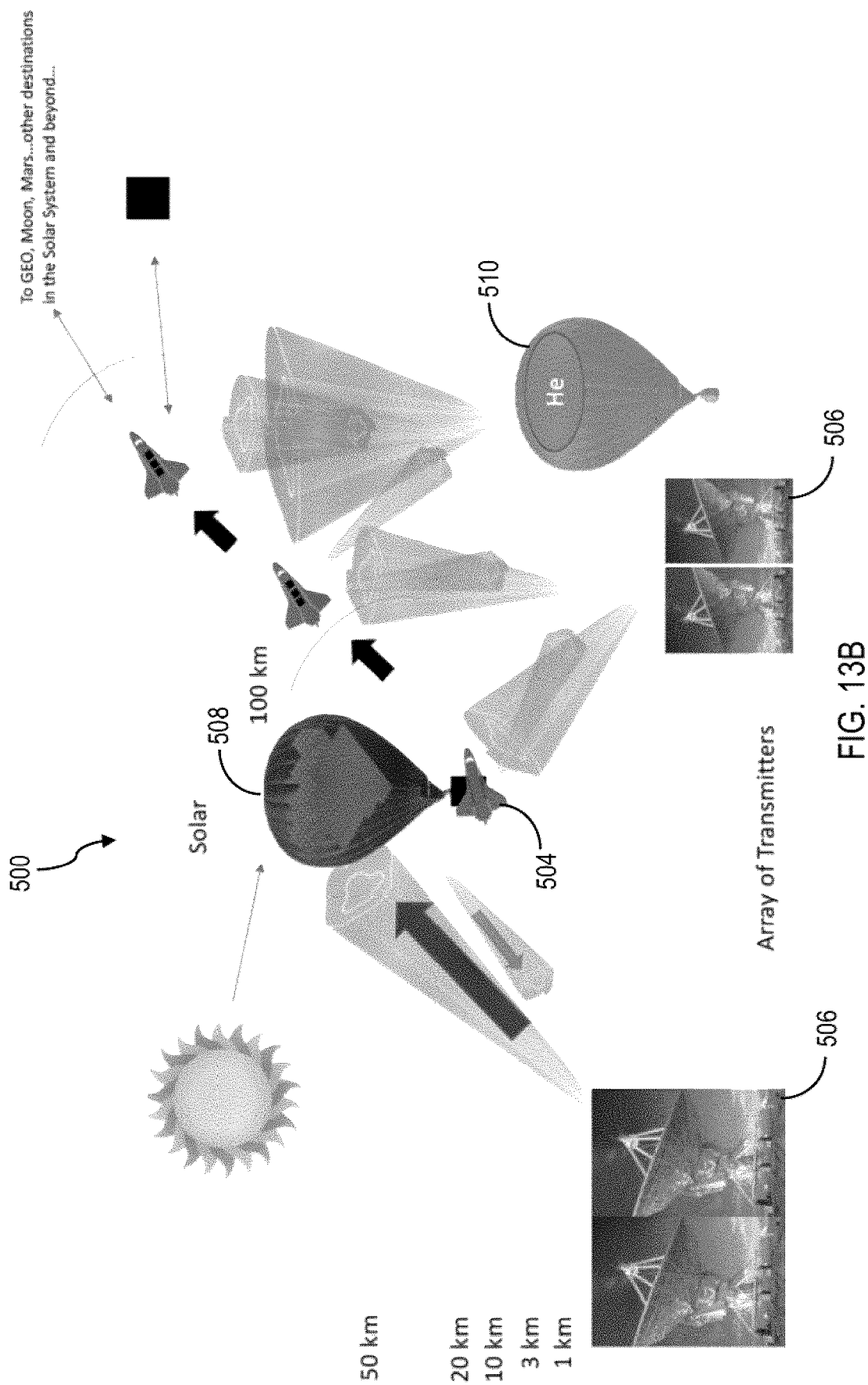

Referring to FIGS. 13A and 13B, shown therein are diagrams of a point-to-point payload transfer system 500, according to an embodiment. The system 500 may be used to transport a payload 502 from the ground to orbit (FIG. 13A) or launch a spacecraft 504 into orbit (FIG. 13B). The system 250 includes an array of ground transmitters 506 for beaming up electromagnetic radiation (wireless power). The system 500 includes a launch balloon 508 for carrying the payload 502 or spacecraft 504.

The launch balloon 508, includes a heat engine to combust metallic fuel for propulsion and to generate electricity to power onboard systems. The launch balloon 508 may also be covered in rectennas to receive the radiation beamed up from the ground transmitters 506 and/or solar radiation to provide the launch balloon 508 with energy for propulsion and lift to carry the payload 502/spacecraft 504. The launch balloon 508 may transport the payload 502/spacecraft 504 up to an altitude of approximately 50 km above the earth. The system 500 includes a secondary airship 510. The secondary airship 510 may track flight path of the launch balloon 508, deployment of payloads 502, 504 and/or interface with satellites in orbit.

Referring to FIG. 13B, the spacecraft 504 may include a heat exchanger (i.e., thermal rectennas) that can use directed power/radiation, from, for example, the secondary airship 510, for power and propulsion once separated from the launch balloon 508.

Figure 14B:
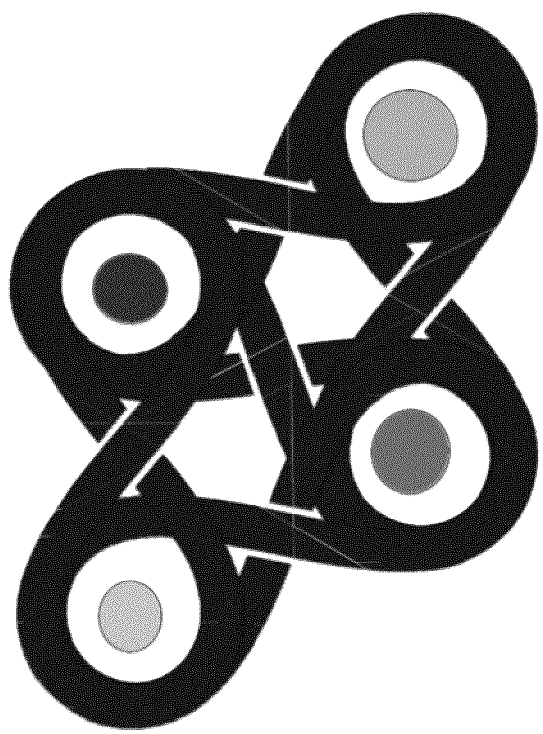
FIGS. 14A-14B are diagrams of cycler systems implementing metallic fuel recycling, according to several embodiments.
Figure 14A:
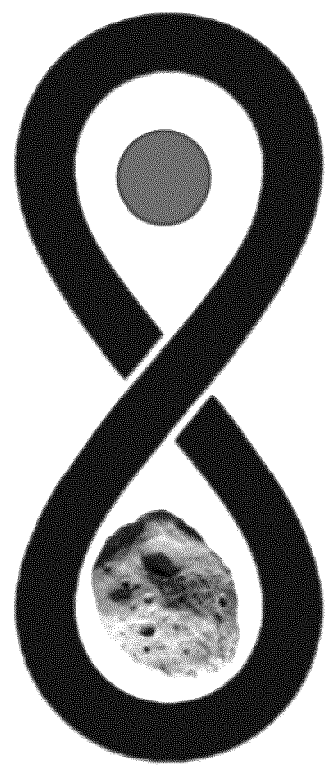

Referring to FIG. 14A, shown therein is a diagram of a cycler transport system 900 between two or more planetary bodies. Conventional space propulsion systems typically only enable one-way travel to distant astronomical bodies due to depletion of fuel reserves carried onboard. Using the systems and methods disclosed herein may advantageously facilitate cycler transport along a figure eight trajectory between two or more planetary bodies by recycling metallic fuel onboard, thereby conserving onboard fuel reserves. Thus, a cycler transport system using recycled metallic fuel may extend a one-way trip into a return trip. Generally, cycler transport by recycling fuel may be possible between any two or more astronomical bodies as shown in FIG. 14B. Spacecraft may also land on an astronomical body to "refuel" by harvesting regolith for processing into metallic fuel to extend a trip, rather than having to return to Earth for refueling. Cycler transport may also be used with terrestrial vehicles to move between two or more points.

Further efficiencies in fuel conservation may be achieved by implementing "looping" methods. In a looping method, a vehicle's heat engine is combined (or operably connected) with a thermal power plant to operate in two phases—a propulsion phase and a power phase. During the propulsion phase metallic fuel (e.g., thermites) are ignited, combusted, and expelled from the heat engine to provide propulsion. By leveraging dispersion techniques which utilize the balance between the concentration of the particles in the carrier fluid and the concentration of the heat and energy required for ignition, a variable fraction of the metallic fuel can be combusted in a loop, and the unburnt fuel that is heated by the combustion is captured to inductively generate electricity in the thermal power plant during the power phase. The unburnt fuel is then cycled back to the heat engine for combustion in the next propulsion phase.

The degree of combustion during the propulsion phase may be controlled by volumetric heating of the metallic fuel to optimize the looping method for propulsion vs. power generation for a given "loop" of metallic fuel usage. For example, when rapid propulsion is required, a first loop will produce complete combustion (no unburn fuel left to be captured), and a second loop will also produce complete combustion. By contrast when both propulsion and power generation is required, a first loop will result in complete combustion and a second loop will result in less than complete combustion whereby the unburnt fuel is captured by a sintering process to generate power thought induction. When only power generation is required (without propulsion) the fuel may be inductively heated by sintering to generate power in the thermal power plant.

According to various embodiments, other looping processes may include the utilization of nanothermites to generate power and propulsion, and the products harvested for use to drive other processes and reactions such as to create other byproducts, further reduced metal oxides to synthesize metallic fuels, further oxidize metal fuels for power and propulsion generation, and recycle, and reuse the byproducts.

Figure 15:
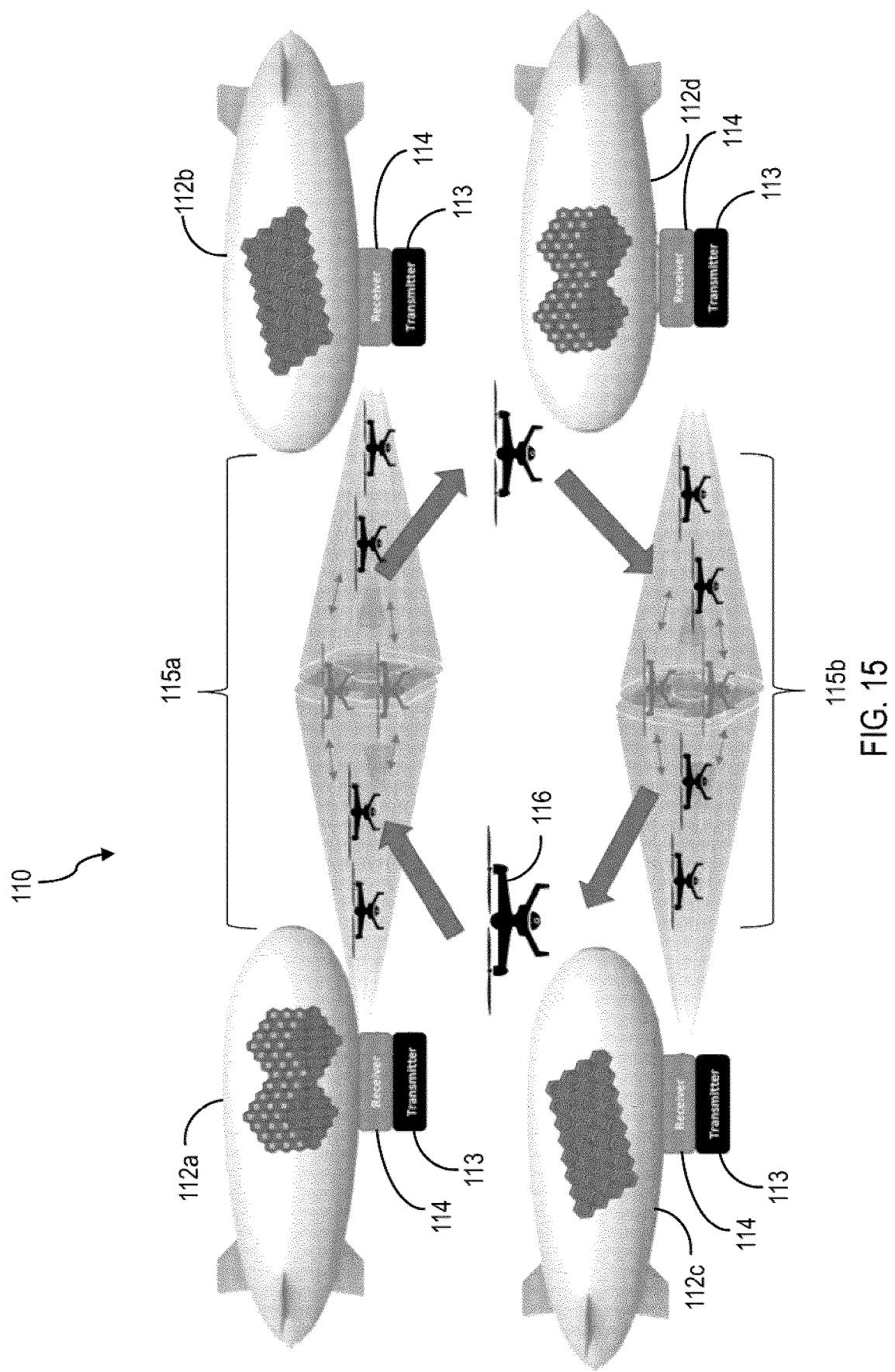
FIG. 15 is a diagram of a point-to-point beam riding system, according to an embodiment.

FIG. 15 is a diagram of a point-to-point (P2P) beam riding system 110, according to an embodiment. The P2P beam riding system 110 includes at least a pair of craft 112*a*, 112*b* (a second pair of craft 112*c*, 112*d* is also shown). The craft 112*a*, 112*b*, 112*c*, 112*d* may be autonomous or semi-autonomous airships (as shown), balloons or drones (i.e., unmanned aerial vehicles, UAVs). Each craft 112*a*, 112*b*, 112*c*, 112*d* includes at least one transmitter 113 and at least one receiver 114 for transmitting and receiving, respectively, EM radiation, for example, microwave radiation. The craft 112*a*, 112*b*, 112*c*, 112*d* are positioned (in the air) in pairs such that the EM radiation transmitted by a first craft 112*a*, 112*c* is received by a second craft 112*b*, 112*d*.

The radiation transmitted and received between the craft produces a beam riding "highway" (shaded regions indicated by reference numbers 115*a*, 115*b*), or a microwave tunnel in the case of microwave radiation, in a volume of air between the craft. The beam riding highway 115*a*, 115*b* may be utilized for wireless power transfer (WPT), wireless data transfer between the craft 112*a*, 112*b* as well as providing over-the-air charging, command and control functions, for beam riding aerial craft (e.g., drone 116) that can be powered and/or recharged by microwave radiation.

Each beam riding highway 115*a*, 115*b* is directional, that is the direction of radiation transmitted between the craft 112*a*, 122*b* is in one direction. The direction of radiation transmission between the craft 112*a*, 112*b* may be reversed. Consequently, the drone 116, may only "ride" the beam riding highway 115*a*, 115*b* in the direction of radiation transmission. A shown, the direction of radiation transmission in the first beam riding highway 115*a*, and the direction of travel for the drone 116 within the first beam highway 115a is generally in the direction from craft 112a to craft 112b. The direction of radiation transmission in the second beam riding highway 115b, and the direction of travel for the drone 116 within the second beam highway 115b is generally in the direction from craft 112c to 112d. For example, the drone 116 may enter the first beam riding highway 115a in the vicinity of the craft 112a and ride the first beam riding highway 115a between the craft 112a, 112b, then exit the first beam riding highway 115a in the vicinity of craft 112b.

Figure 16:
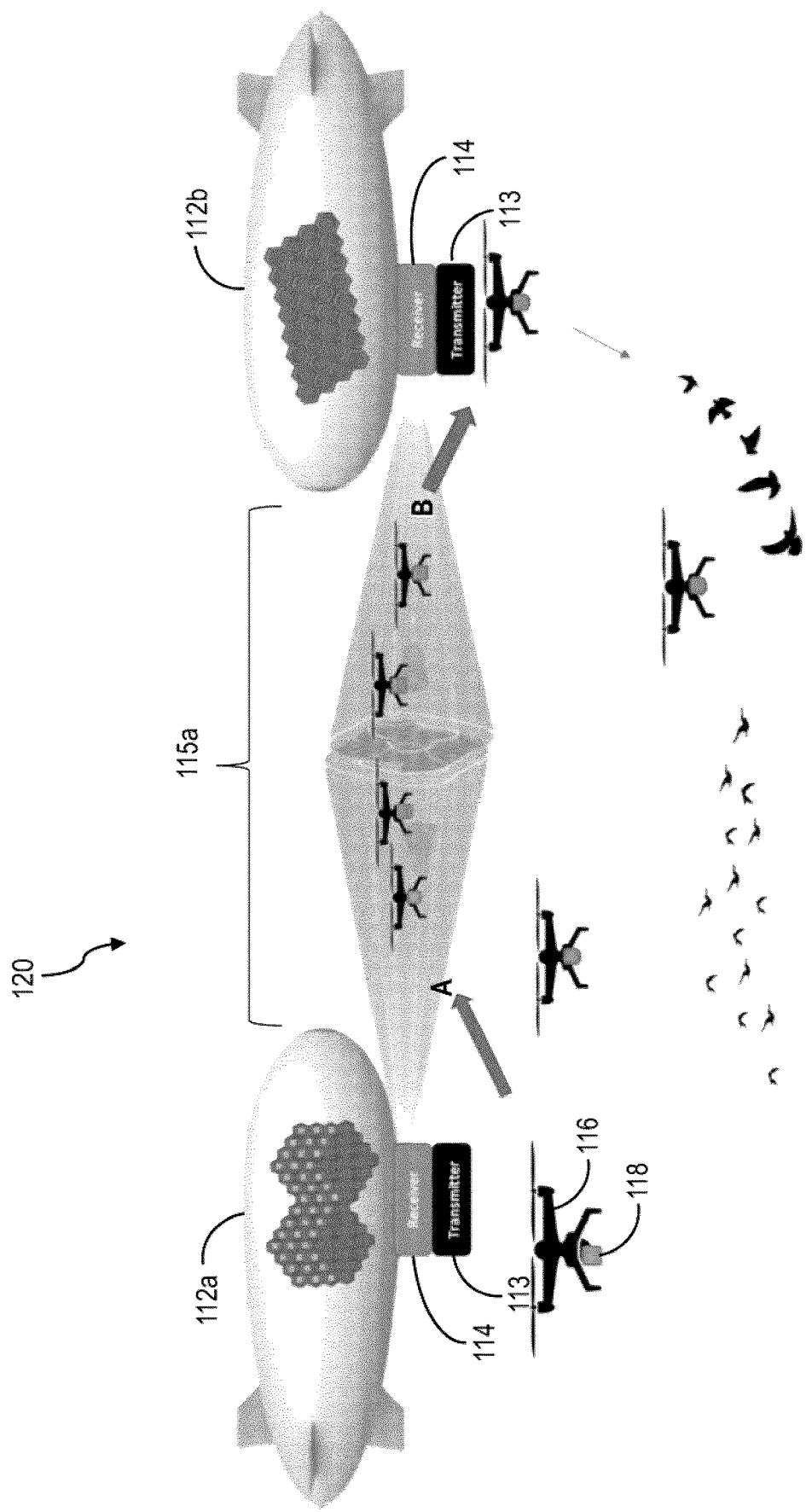
FIG. 16 is a diagram of point-to-point wireless power transmission for wildlife management applications, according to an embodiment.

FIG. 16 is a diagram of a system 120 for point-to-point wireless power transmission for wildlife management applications. The system 120 is substantially similar to the system 110 in FIG. 15, and includes a pair of aerial craft 112a, 112b that produce a microwave beam riding highway 115a between them. The drone 116 includes a rectenna rechargeable power source 118. The power source 118 may be recharged by the drone 116 entering the beam riding highway 115a so that the rectenna receives microwave radiation and converts it to electricity that is stored in the power source 118.

In the exemplary application shown in FIG. 16 the drone 116 is used for wildlife management applications in the vicinity of an area of interest, such as an airport to keep birds away from aircraft flight paths. When the drone 116 is low on power, it may fly into the beam riding highway 115a, for example, at point A to recharge the power source 118. As the drone 116 travels between the aerial craft 112a, 112b along the beam riding highway 115a, the power source 118 is recharged. When the power source 118 is sufficiently charged, the drone 116 exits the beam riding highway 115a, for example, at point B and may then return to its operational mode of keeping birds away.

As noted above, the travel of the drone 116 along the beam riding highway is in one direction only (the same direction of microwave radiation transmission between the aerial craft 112a, 112b) to allow the drone 116 maximum exposure to microwave radiation in order to charge the power source to sufficient levels required for operation. The drone 116 may travel a further distance along the beam riding highway 115a to recharge the power source 118 more.

Figure 17:
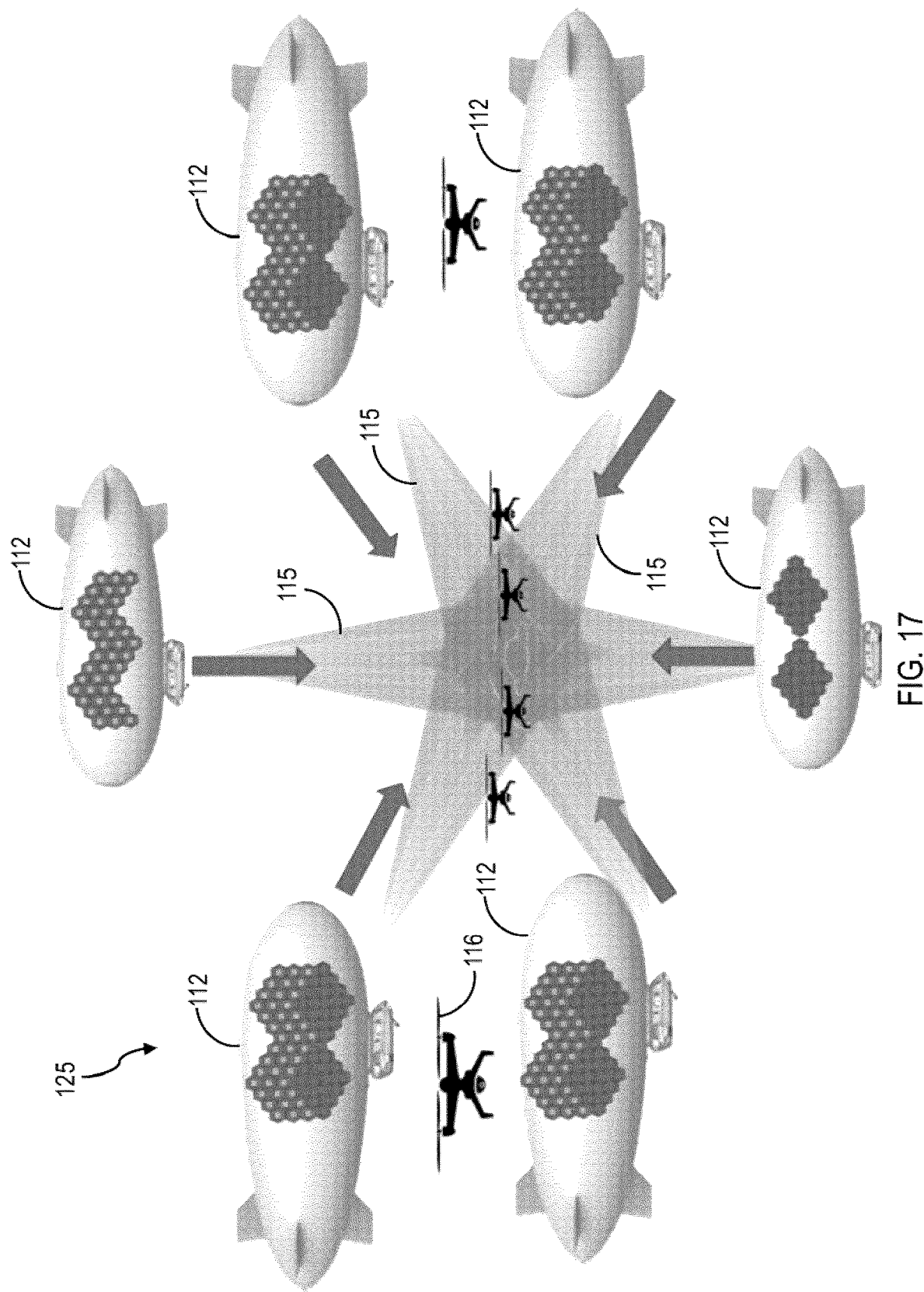
FIG. 17 is a diagram of a multi-directional beam riding system, according to an embodiment.

Referring to FIG. 17, one or more beam riding highways 115 may be implemented within a point-to-point beam riding system 125 to allow for bidirectional or multi-directional travel of a beam riding drone 116. Accordingly, the drone 116 may ride one beam riding highway 115 to travel in one direction and ride another beam riding highway 115 to travel in another direction. Generally, a beam riding highway 115 may be implemented to travel in any direction between appropriately positioned aerial craft 112. The direction of travel of the drone 116 along the beam riding highways 115 may result in a change altitude, a change in position at the same altitude or a change in altitude and position of the drone 116.

Figure 18:
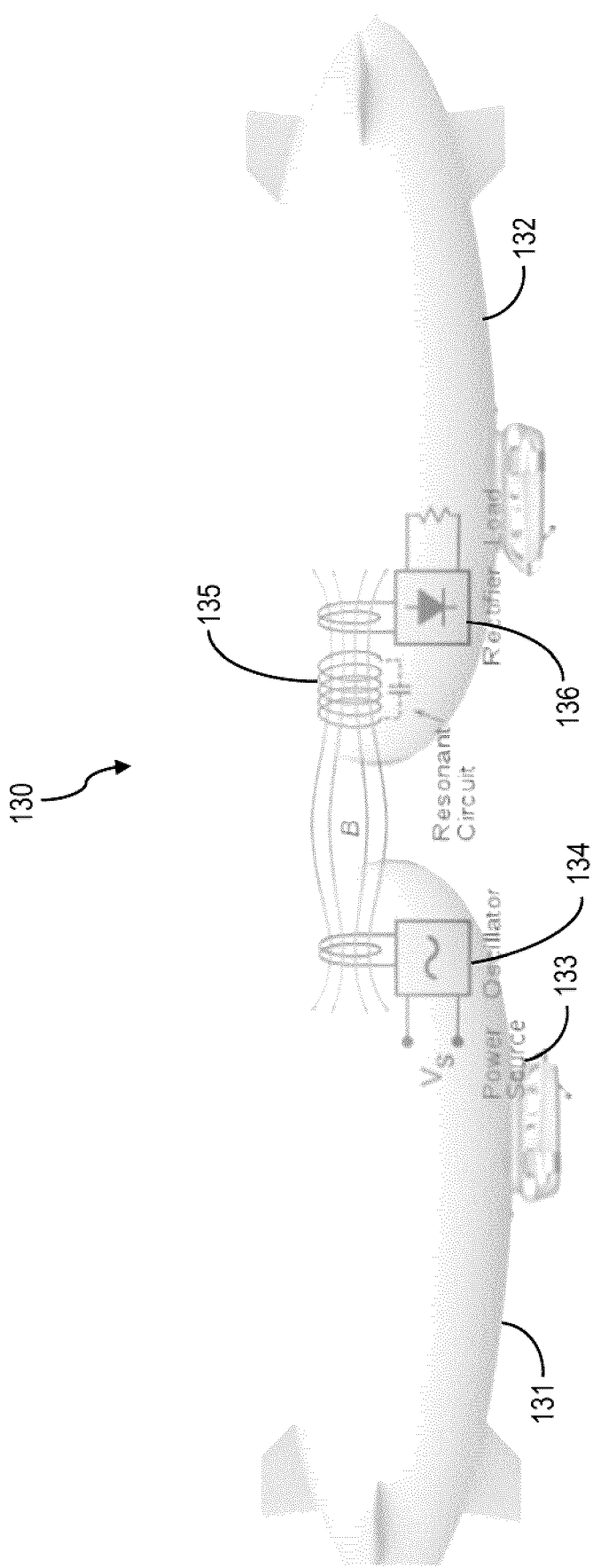
FIG. 18 is a diagram of inductive-coupled magnetic resonance wireless power transfer between two aerial craft, according to an embodiment.

FIG. 18 is a diagram of inductive-coupled magnetic resonance wireless power transfer 130 between a transmitting aerial craft 131 and a receiving aerial craft 132. The transmitting craft 131 includes a power source 133 connected to an oscillator 134. The receiving craft 132 includes a resonant circuit 135 connected to a rectifier 136. The oscillator 134 draws DC power from the power source 133 and converts it to AC power in a circuit to generate a magnetic field, B. If the receiving craft 132 is in close enough proximity to the transmitting craft 131, the resonant circuit 135 will be within the magnetic field, B, thus causing a current flow through the resonant circuit 135. The AC current flowing from the resonant circuit 135 is converted to DC power by the rectifier 136 and can then be used to power the load of the receiving craft 132.

Referring to FIGS. 19-20, shown therein are diagrams of an inductive power transfer system 140 and a resonant power transfer system 150, 155 for wireless power transmission between aerial craft.

The inductive power transfer system 140 includes a transmitting aerial craft 142 having a primary (transmitter) coil and a receiving aerial craft 146 having a secondary (receiver) coil. It should be noted that the primary and secondary coils are located within the respective craft 142, 146 and are depicted as primary coil field 144, and secondary coil field 148 for ease of explanation. Current running passing through the primary coil generates a magnetic field B in the proximity of the primary coil field 144. If the receiving craft 144 is in proximity to the magnetic field such that a sufficient portion of the magnetic field intersects the secondary coil, a current will be generated in the secondary coil thus resulting in inductive power transfer between the transmitting craft 142 and the receiving craft 146.

The resonant power transfer systems 150, 155 includes a transmitting aerial craft 151 having a primary (transmitter) coil and one or more receiving aerial craft 152a, 152b, 152c, 152d, 152e each having a secondary (receiving) coil. It should be noted that the primary and secondary coils are located within the respective craft 151, 152a, 152b, 152c, 152d, 152e and are depicted as a primary coil field 153, and secondary coil fields 154a, 154b, 154c, 154d, 154e for ease of explanation. In the resonant power transfer systems 150, 155, the wireless transmission of power from the transmitting craft 151 to the receiving craft 152a, 152b, 152c, 152d, 152e depends only on the secondary coils 154a, 154b, 154c, 154d, 154e intersecting a reasonable amount of primary coil flux lines (i.e., intersection the magnetic field, B, generated by current passing through the primary coil 153).

A resonant power transfer system 155 may be preferable to the inductive power transfer system 140 depending on the size and number of the respective transmitting and receiving craft. For example, in the resonant power transfer system 155 more smaller sized craft may receive wireless power transmission simultaneously compared to the inductive power transfer system 140.

Figure 21:
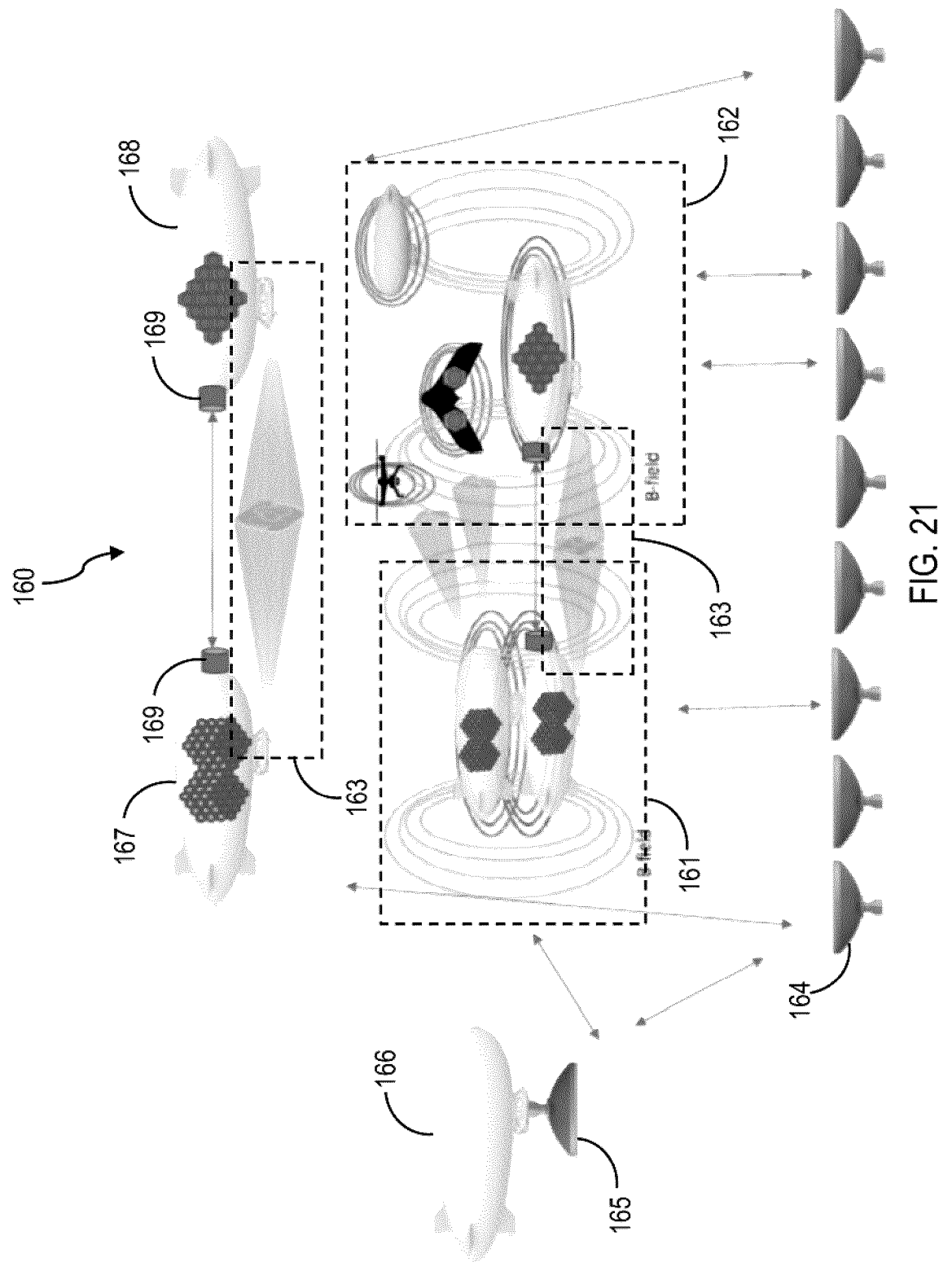
FIG. 21 is a diagram of a hybrid wireless power transmission system, according to an embodiment.

FIG. 21 is a diagram of a hybrid wireless power transmission system 160, according to an embodiment. The hybrid power transmission system 160 may include one or more of inductive power transfer systems 161 (i.e., inductive power transfer system 140 in FIGS. 19-20), resonant power transfer systems 162 (i.e., resonant power transfer systems 150, 155 in FIGS. 19-20) and beam riding highways 163 (i.e., beam riding highway 115a, 115b in FIGS. 15-17) between respective transmitting and receiving craft.

The hybrid wireless power transmission system 160 may further include a plurality of ground parabolic transmitters 164 to transmit EM radiation from the ground that is received by aerial craft 166 having rectennas to convert the EM radiation to current and wirelessly transmit the power to other aerial craft via one or more inductive power transfer systems 161, resonant power transfer systems 162 and/or beam riding highways 163.

In addition, the transmitting craft 167 and the receiving craft 168 may include lasers 169 to transfer excess or unused EM radiation received by the receiving craft 168 back to the transmitting craft 167 as laser radiation to conserve energy and propagate the beam riding highway 163 for use by other aerial craft. The craft 167, 168 may further include one or more transmitters and receivers (not shown) for transmitting control and data signals between the craft 167, 168.

Accordingly, the hybrid power transmission system 160 may be readily adapted, as needed, to power a variety of aerial craft having different wireless energy transfer capabilities and to also provide control and data signals to perform a variety of tasks.

Figure 22:
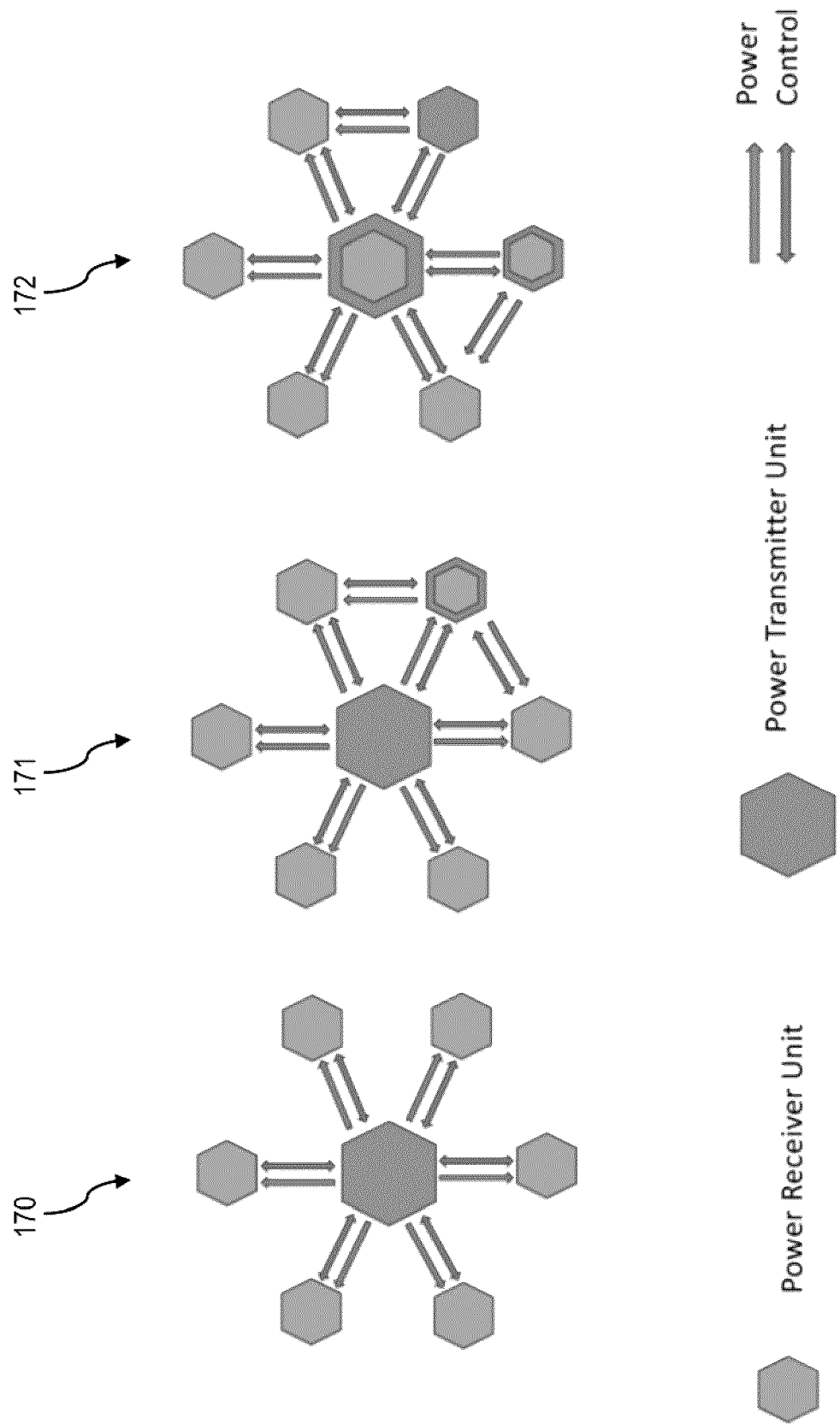
FIG. 22 are diagrams of system architectures for wireless power and data transmission, according to several embodiments.

FIG. 22 shows diagrams of system architectures 170, 171, 172 for wireless power and control data transmission, according to several embodiments. The control data may be: data signals to control operation or the aerial craft; data signals with respect to power usage/transmission; sensor data, advanced metering interfaces, wayfind, and/or in-situ monitoring data etc. Each of the power receiver and power transmitter units depicted in the architectures 170, 171, 172 may be located on an aerial craft that is part of a larger deployment or swarm of aerial craft.

A central system architecture 170 includes a central transmitter unit surrounded by receiver units. Power is wirelessly transmitted one-way from the central transmitter unit to each of the receiver units. Control (data) signals may be wirelessly transmitted two-way between the central unit and any of the receiver units.

A distributed system architecture 171 includes a central power transmitter unit, a power transmitter/receiver unit and several receiver units surrounding the central transmitter unit. The central transmitter unit transmits power to each of the surround receiver units including the transmitter/receiver unit. The transmitter/receiver unit may also transmit power to adjacent receiver units. Control (data) signals may be wirelessly transmitted two-way between the central transmitter unit and any of the receiver units as well as between the transmitter/receiver unit and adjacent receiver units.

A hybrid system architecture 172 includes a central power transmitter/receiver unit surrounded by several receiver units, a power transmitter unit and a second power transmitter/receiver unit. The central transmitter/receiver unit may transmit power to any of the surrounding receiving units. The power transmitter unit may transfer power only to the adjacent receiving unit and central transmitter/receiver unit. Similarly, the second power transmitter/receiver unit may only transmit power to the adjacent receiving unit and the central transmitter/receiver unit. Control signals may be wirelessly transmitted two-way between the central transmitter/receiver unit and any of the surrounding receiver units, the power transmitter unit and the second transmitter/receiver unit, as well as between the transmitter/receiver unit and adjacent receiver units.

FIG. 23 is a diagram recording wireless power and data transfer in a blockchain 180, according to an embodiment. Each wireless power transmission (light shaded arrows) and control (data) signals (dark shaded arrows) transmitted and received between two aerial craft 182, 184 may be recorded as a transaction between the transmitting and receiving craft using blockchain technology between mobile nodes.

Figure 24:
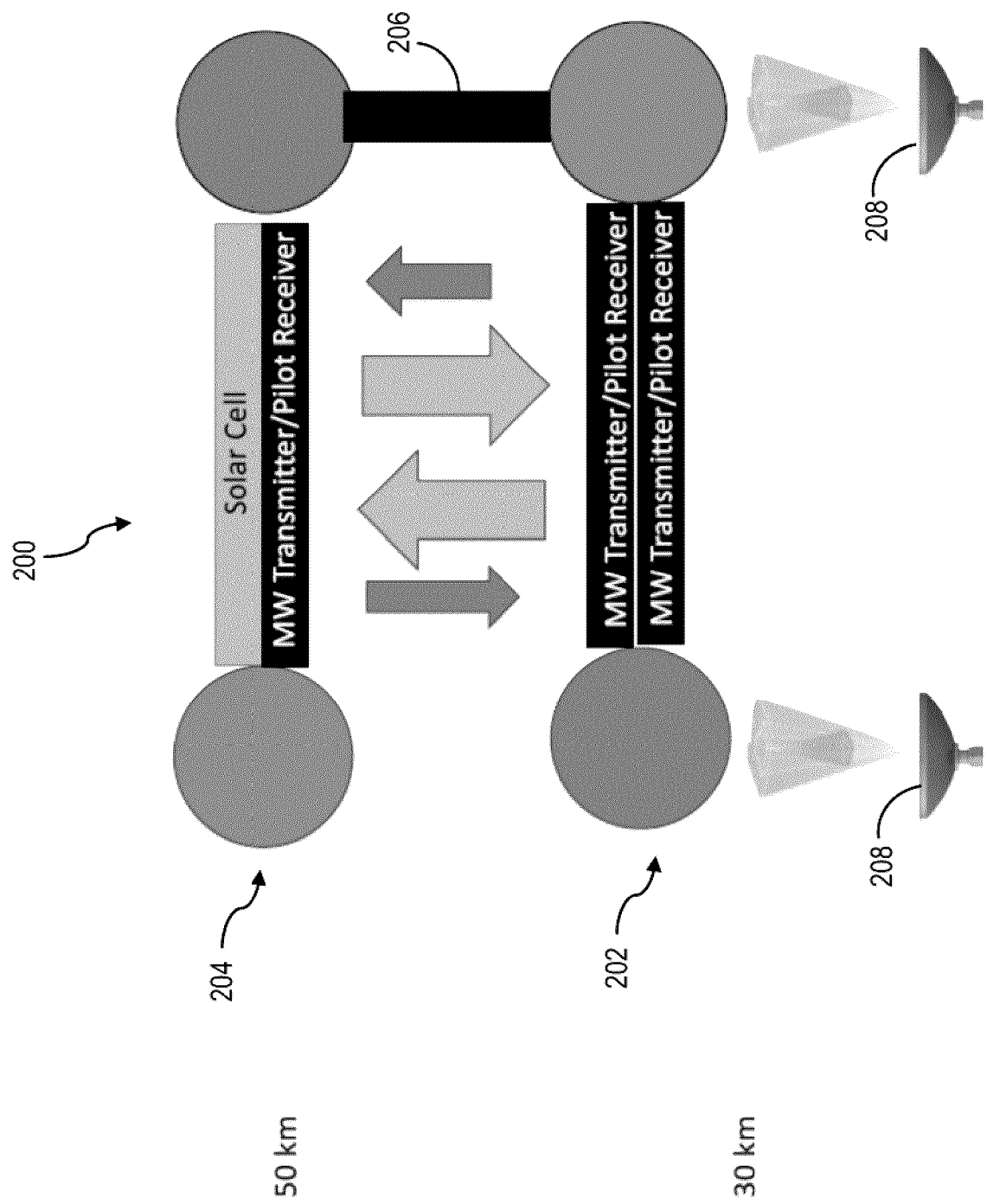
FIGS. 24-25 are diagrams of a microwave elevator system, according to an embodiment.
Figure 25:
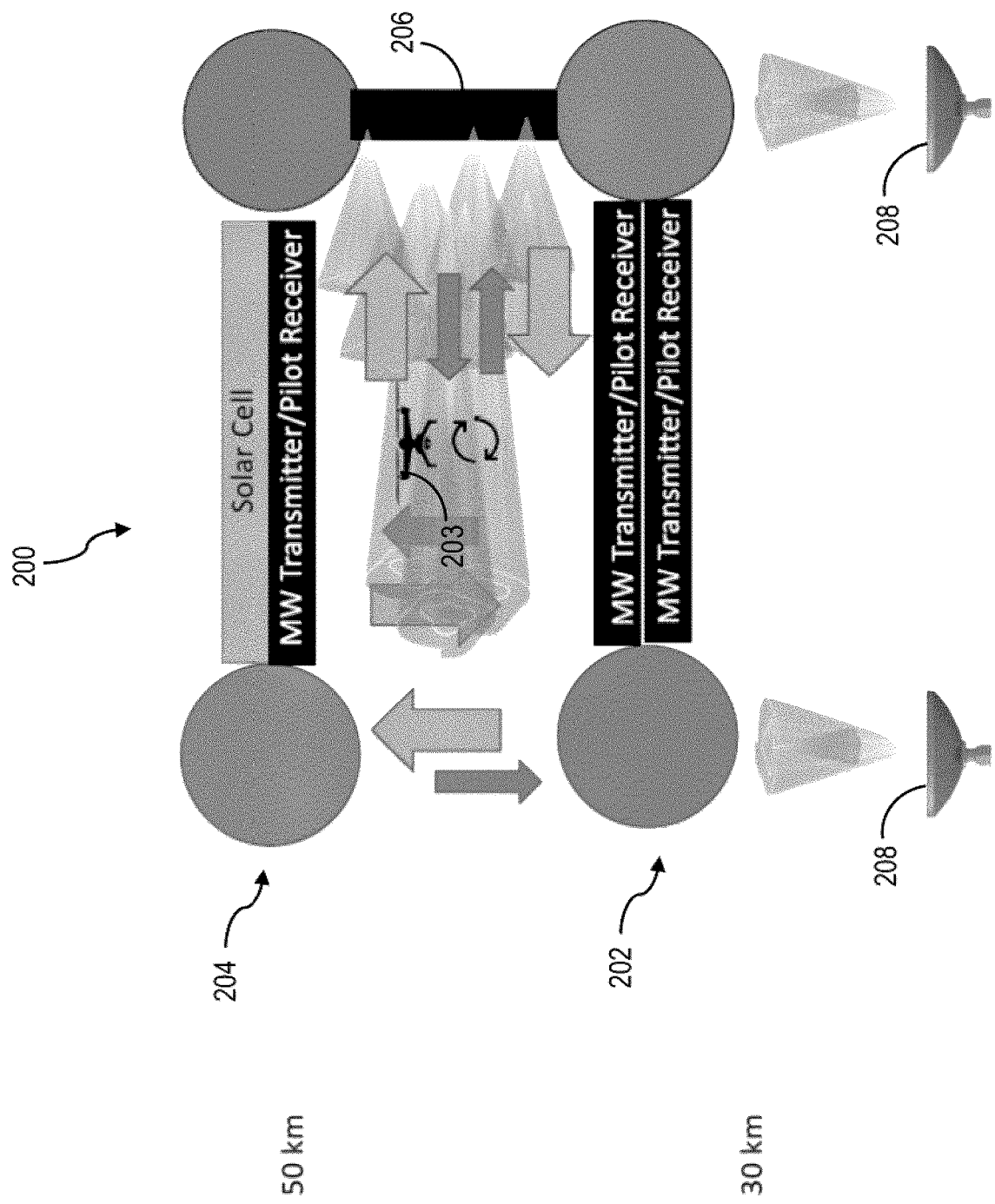

FIGS. 24-25 are diagrams of a microwave elevator system 200 for orbital raising/descending and horizontal/vertical travel, according to an embodiment. It should be noted that the diagrams are not drawn to scale. The elevator system 200 includes a first multilayer rectenna structure 202 joining a first pair of aerial craft in a dumbbell configuration at approximately 30 km altitude above the earth. The first multilayer rectenna structure 202 includes a microwave transmitter/pilot signal receiver layer. The elevator system 200 includes a second multilayer rectenna structure 204 joining a second pair of aerial craft in a dumbbell configuration at approximately 50 km altitude above the earth. The second multilayer rectenna structure 204 includes a solar cell layer attached to a microwave transmitter/pilot signal receiver layer. The elevator system 200 may include a tether 206 for physically connecting the first multilayer rectenna structure 202 to the second multilayer rectenna structure 204.

The system 200 includes ground parabolic microwave transmitters 208 for transmitting microwave radiation upward to the first rectenna structure 202. The radiation received by the first rectenna structure 202 may be retransmitted and received by the second multilayer rectenna structure 204, thus forming a beam riding highway between the first and second multilayer rectenna structures 202, 204. Similarly, solar radiation absorbed by the second multilayer rectenna structure 204 may be transmitted downward as microwave radiation that is received by the first rectenna structure 202 thus forming a beam riding highway between the first and second multilayer rectenna structures 202, 204. Aerial craft 203 having rectennas may enter the beam riding highway for vertical (up/down) travel between the first and second multilayer rectenna structures 202, 204.

The tether 206 may further include a microwave transmitter array to project a horizontal beam riding highway which aerial craft 203 may enter for horizontal travel between the first and second multilayer rectenna structures 202, 204.

Figure 26:
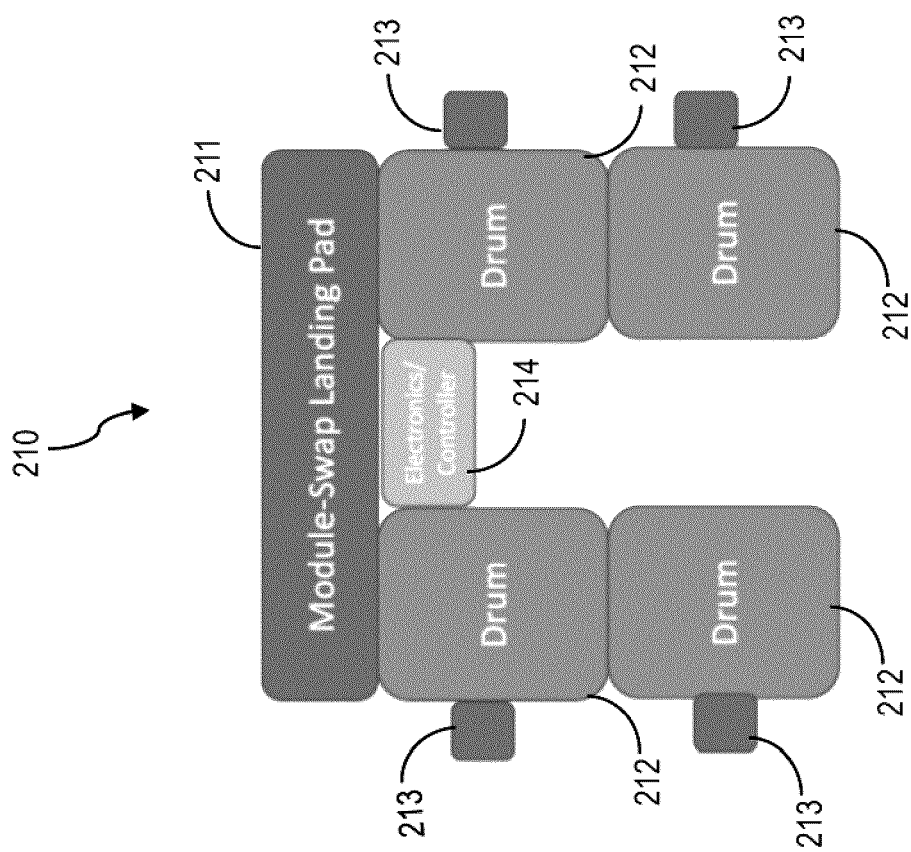
FIG. 26 is a diagram of module swapping system for aerial craft, according to an embodiment.

FIG. 26 is diagram of module swapping system 210 for aerial craft, according to an embodiment. The module swapping system 210 may be used to swap modules between aerial craft. The module may be a fuel source (e.g., a battery, capacitors, super capacitors, inductors, super inductors, metallic fuel, reactive metal compounds, or the like). The module may also be structures of rectennas, coils, capacitors or solar cells to receive EM radiation. The module may be electronics, on-board computers, sensors or data storage devices or other parts for repair and/or maintenance, reconfiguration and/or component upgrade.

The module swapping system 210 may be positioned within a "mothership" or large aerial craft configured to service smaller aerial craft. The module swapping system 210 includes a landing pad 211 for receiving aerial craft for module swapping. The landing pad 211 may be present in a hanger, or the like, on the mothership. The landing pad 211 may be located on an external surface of the mothership.

The module swapping system 210 includes one or more drums 212 for storing modules. Generally, one module is stored within one drum 212. The drums 212 may be stored in a storage configuration adjacent to the landing pad 211 such that when a drum 212 is to be swapped, it is rotated from the storage position onto the landing pad 211 for swapping. The module swapping system 210 includes servos 213 connected to each drum 212 for rotating the drums 212 from the storage configuration to a swapping position on the landing pad 211. The servos 213 may also swap the module within the drum 212 for the module on the aerial craft on the landing pad 211. The module swapping system 210 further includes a controller 214 for controlling the servos 213 and swapping of modules. The controller 214 may operate to swap modules according to a schedule with autonomous and semi-autonomous operations.

Figure 27:
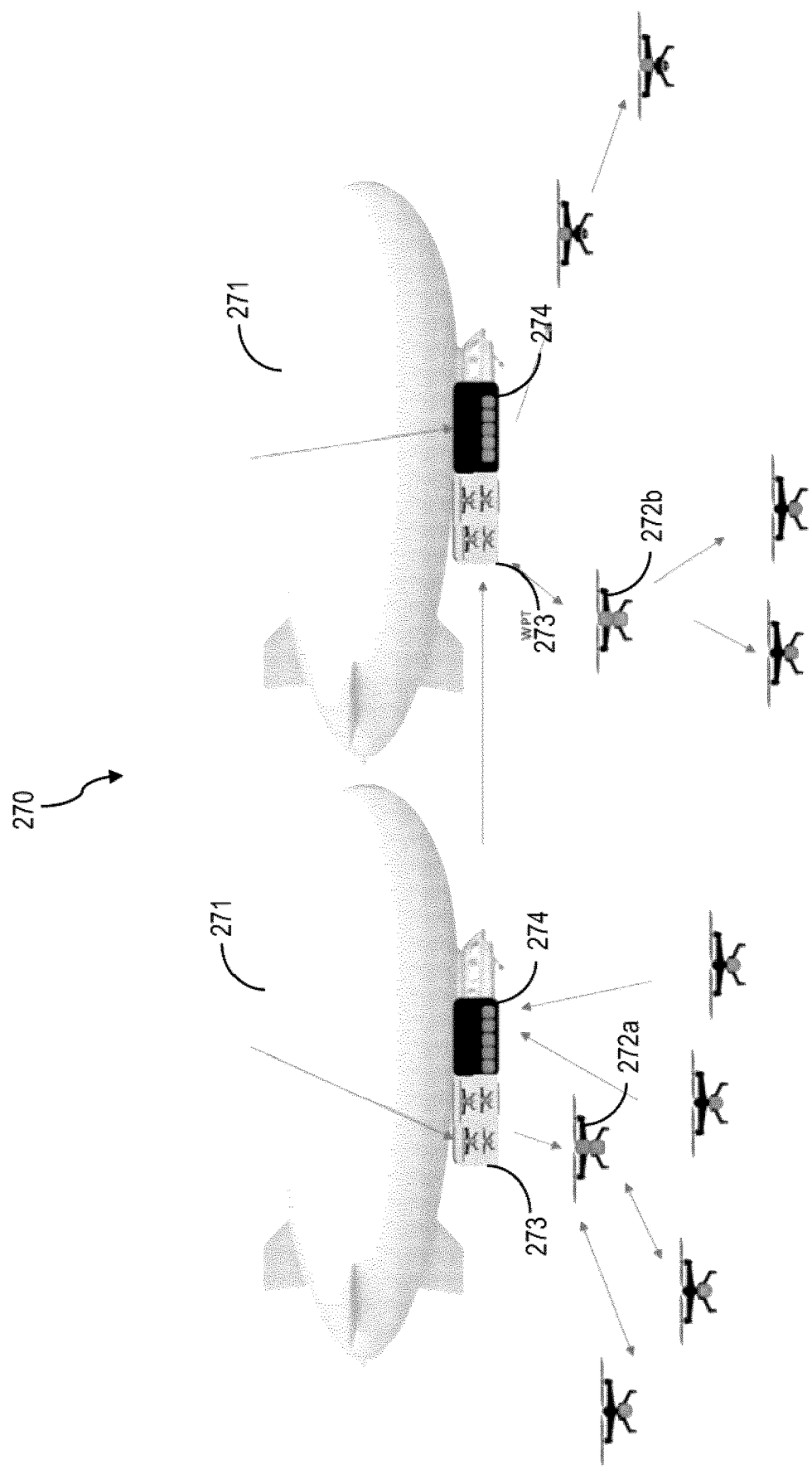
FIG. 27 is a diagram of an in-flight charging system for drones, according to an embodiment.

FIG. 27 is a diagram of an in-flight charging system 270 for drones, according to an embodiment. The system 270 includes motherships 271 (i.e., airships) to transport, deploy and recharge drones 272. The mothership 271 includes a drone deployer 273 to store and deploy fully charged drones 272*a*. The mothership 271 includes a battery swapping system 274 for recharging battery depleted (uncharged) drones 272*b*. Uncharged drones 272*b* may dock with the mothership 271 to have their battery replaced by the battery swapping system 274. Uncharged drones 272b may also dock with the mothership 271 to have their battery recharged. The mothership 271 may also include components (inductions coils, etc.) for wireless power transfer between the mothership 271 and uncharged drones 272b so that drones may recharge in-flight when in close enough proximity to the mothership 271.

Figure 28:
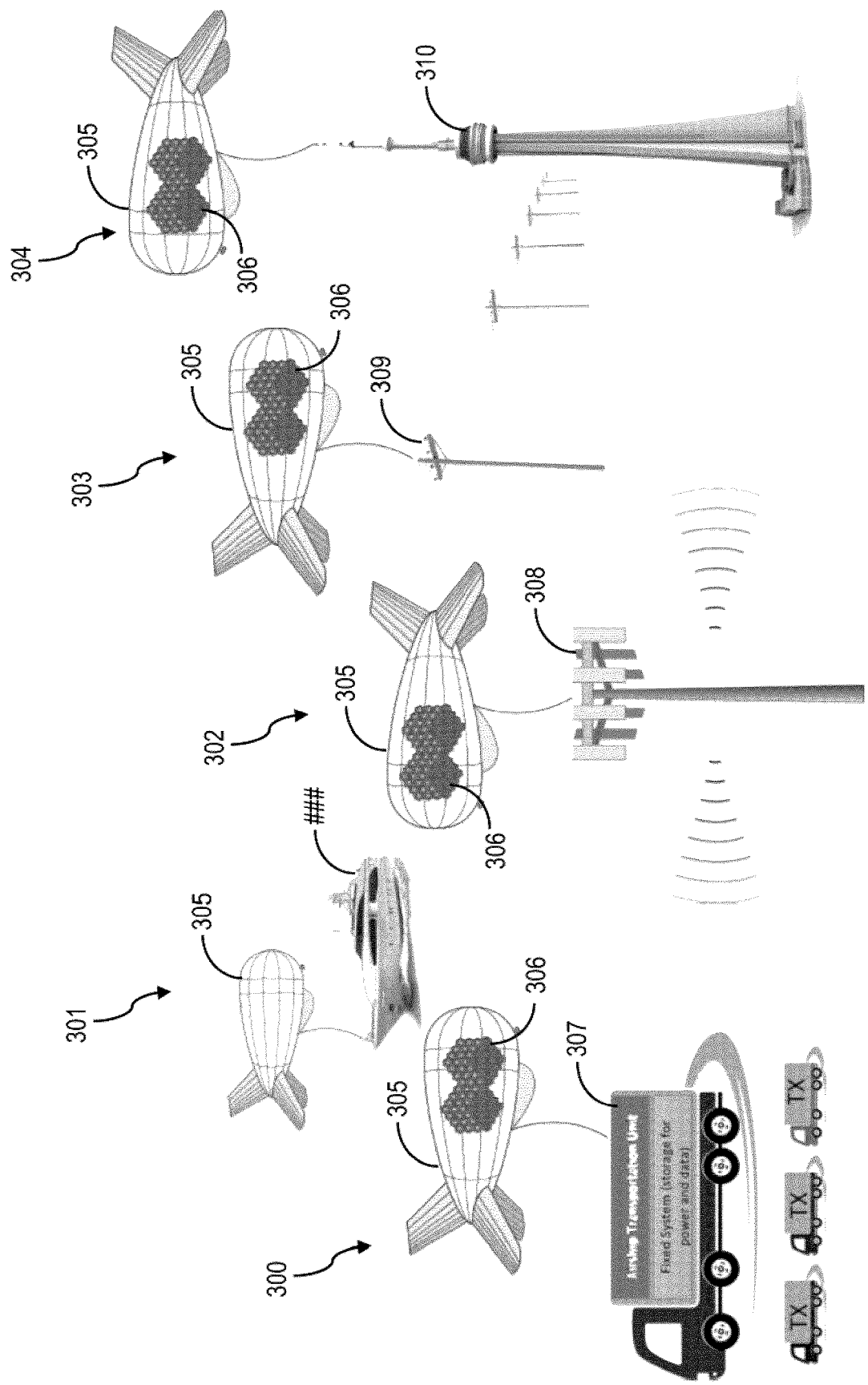
FIGS. 28-29 are diagrams of ground tethered hybrid wireless power transfer systems, according to several embodiments.

FIG. 28 is a diagram of ground tethered hybrid wireless power transfer systems 300, 301, 302, 303, 304, according to several embodiments. Each system 300, 301, 302, 303, 304 includes a tethered airship 305 covered in rectennas 306. Each system 300, 301, 302, 303, 304 includes a ground-based power supply 307, 308, 309, 310. The ground-based power supply may be a vehicle 307. The ground-based power supply may be a radio communications tower 308. The ground-based power supply may be an utility pole 309. The ground-based power supply may be a building/structure 310. Power from the ground-based power supply 307, 308, 309, 310 is sent up to the airships 305 via the tether.

Figure 29:
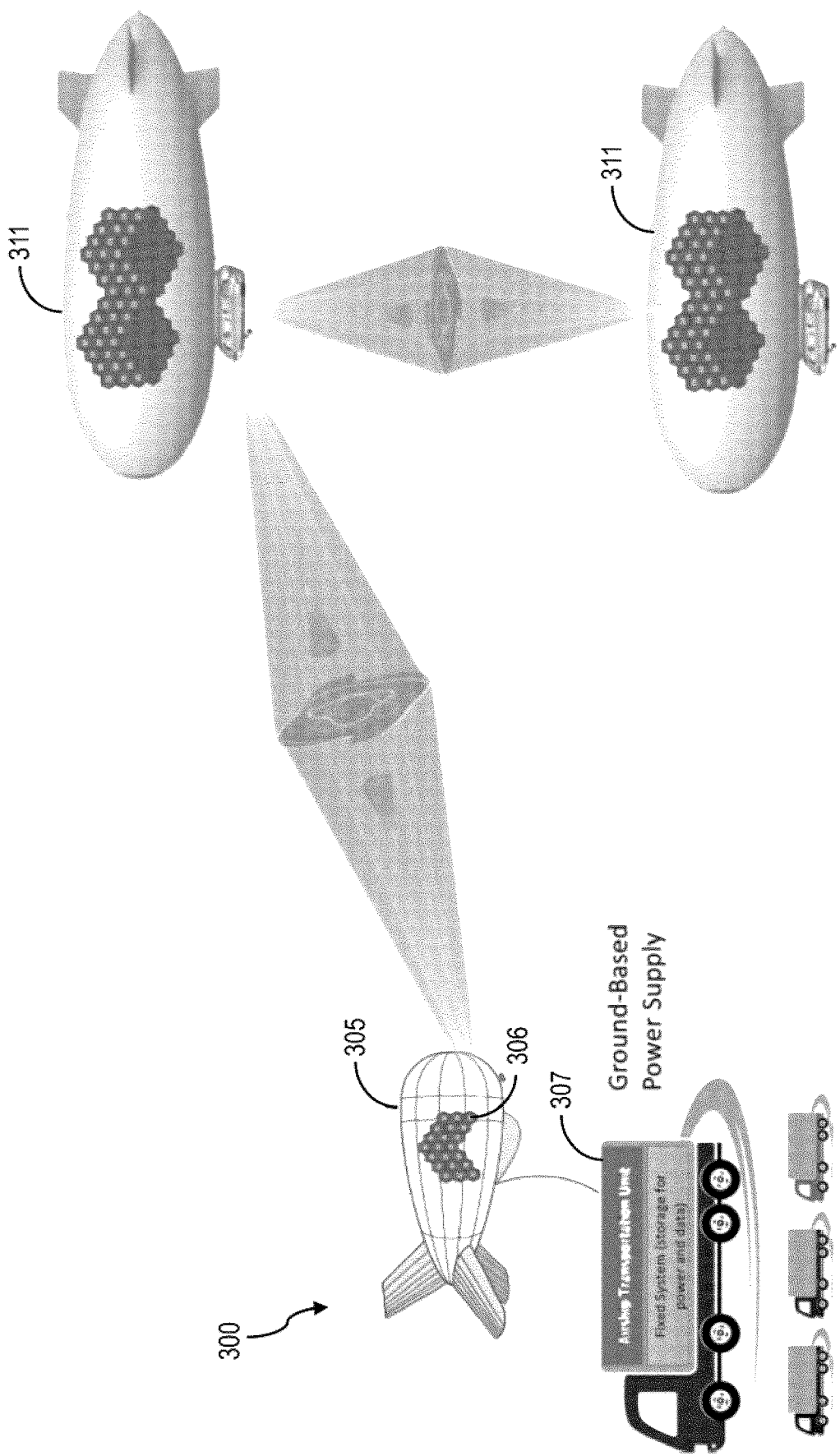

FIG. 29 is a diagram of ground tethered hybrid wireless power transfer system 300 shown in relation to untethered rectenna covered airships 311.

Referring to FIGS. 28 and 29, transmitting power from a ground-based source to an untethered airship 311 requires a high intensity of electromagnetic radiation. Such a high intensity beam of radiation may cause interference with electrical devices on or near the ground. Accordingly, it may be advantageous to transmit power from a ground-based power source to a tethered airship 305, via a tether, to eliminate the potential for electromagnetic radiation interference near the ground. Once the power is received by the tethered airship 305, it may be beamed as radiation to other airships at higher or lower elevations without interfering with ground-based electrical devices.

Figure 30:
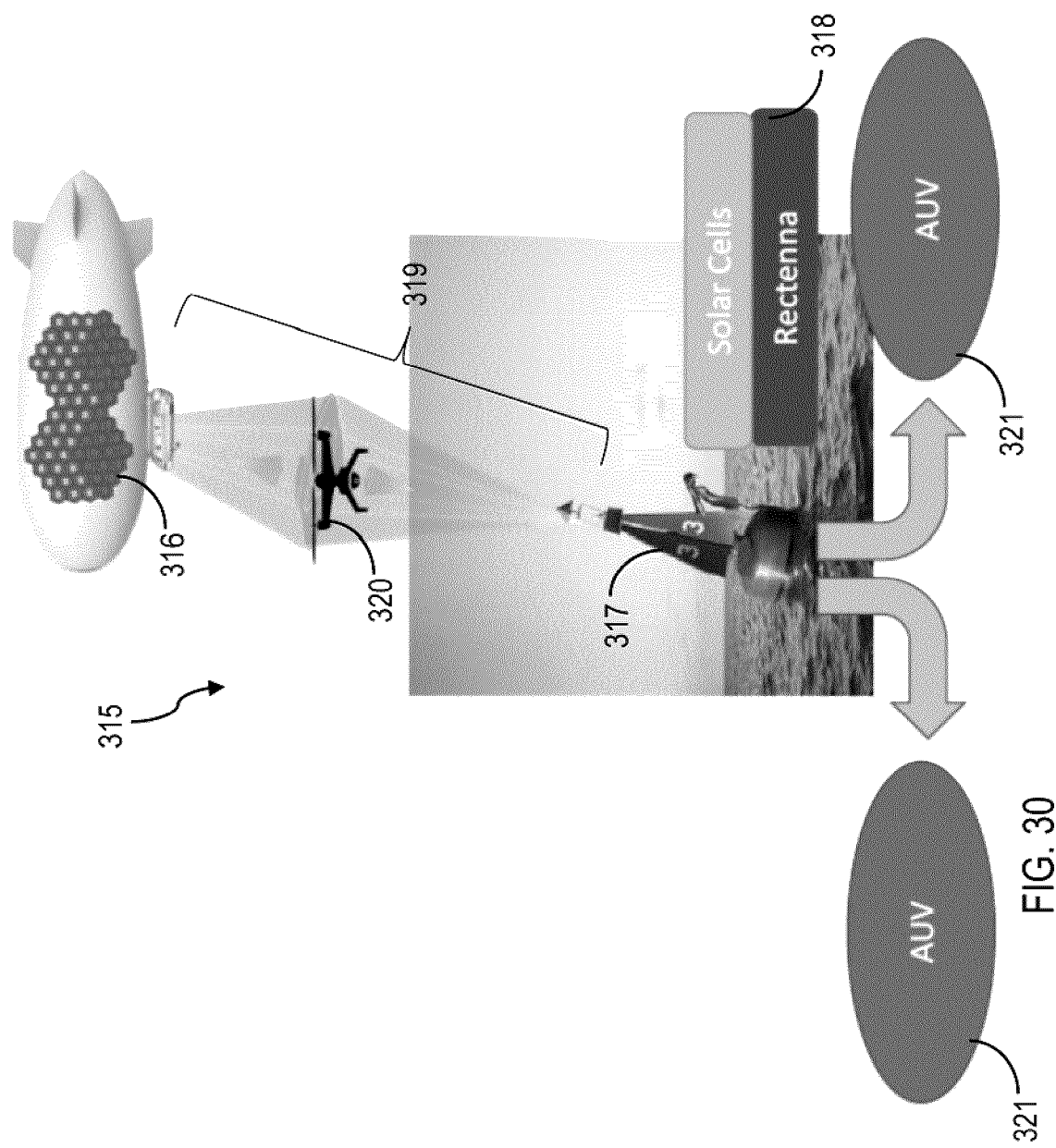
FIG. 30 is a diagram of an air-water interface application for wireless power transmission systems, according to an embodiment.

FIG. 30 is a diagram of an air-water system 315 for wireless power transmission, according to an embodiment. The system 315 includes an airship 316 having a transmitter to beam radiation downward. The system 315 includes a buoy 317 having rectennas 318 for receiving the radiation beamed from the airship 316 to create a beam riding highway 319 between the airship 316 and the buoy 317. The beam riding highway 319 may be used to transport drones 320 between the airship 316 and the buoy 317 in the manner described above with reference to FIGS. 2-4. Radiation in the beam may also be received by the rectennas 318 on the buoy 317 and converted to electricity. The buoy 317 may include solar cells for converting solar radiation to electricity. The solar cells and rectennas 318 on the buoy 317 may be deployable, inflatable and additively manufactured.

The buoy 317 may be configured as a charging station to store power generated by the solar cells and/or the rectennas. The buoy 317 may include underwater architecture (not shown) to support the charging of multiple underwater vehicles 321.

FIG. 31 is a diagram of aerial craft connectivity with smart city infrastructure for wireless power and data transmission, according to an embodiment. Aerial craft 330 having a phased array communication system can be used to create a mobile backhaul support system for rapid response communication with mobile phones, computers and devices on the ground (not shown) by connecting to existing communication infrastructure 335 (e.g., utility poles). Aerial craft 330 may also connect with existing electrical grid infrastructure 336 (e.g., utility poles) to draw power for recharging, rather than having to land to recharge and expend additional battery power unnecessarily. The aerial craft 330 may also transmit power to the grid 336.

While the above description provides examples of one or more apparatus, methods, or systems, it will be appreciated that other apparatus, methods, or systems may be within the scope of the claims as interpreted by one of skill in the art.

The invention claimed is:

1. A method for producing electricity and thrust from recyclable metallic fuels, comprising:
   inductively heating a metallic fuel in a heat engine, causing at least a partial reaction of the metallic fuel;
   transferring heat from the at least partial reaction of the metallic fuel to release energy;
   capturing reaction byproducts and unburnt fuel from the at least partial reaction of the metallic fuel, wherein the reaction byproducts include a first metal oxide;
   directing the unburnt metallic fuel and the reaction byproducts to storage and/or to the heat engine for further combustion; and
   recycling the first metal oxide to regenerate the metallic fuel and/or other products.

2. The method of claim 1, wherein the metallic fuel is one or more of: a nanothermite, a microthermite and thermite.

3. The method of claim 1, wherein the metallic fuel comprises a metal and an oxidizer, wherein the oxidizer is a second metal oxide.

4. The method of claim 1, further comprising passively capturing and converting excess heat from the at least partial reaction of the metallic fuel into electricity by a thermal energy harvesting system.

5. The method of claim 1, wherein the reaction byproducts further include a metal that is oxidizable for heating and/or combustion.

6. The method of claim 1, further comprising:
   inductively generating electricity in a thermal energy harvesting system using heat from the unburnt metallic fuel and the reaction byproducts.

7. The method of claim 1, further comprising:
   recycling the reaction byproducts by one or more chemical processes to produce the other products.

8. The method of claim 7, wherein the one or more chemical processes comprise one or more of: hydrogenation, methanation, carbothermal reduction and electrolysis or the like.

9. The method of claim 1, wherein the metallic fuel is heterogeneous comprising metallic particulates surrounded by a nanocomposite hydrogel binder.

10. The method of claim 1, wherein the metallic fuel is heterogeneous comprising metallic particles and a catalyst for catalytic oxidation of the metallic particles or catalytic reduction of the reaction byproducts.

11. The method of claim 10, wherein the catalyst is stimuli-responsive being chemically, mechanically, magnetically or thermally activatable.

12. The method of claim 7, wherein energy for the one or more chemical processes is provided by inductive-coupled and/or magnetic resonance wireless energy transmission.

13. The method of claim 1, further comprising controlling volumetric heating of the metallic fuel to regulate heating and/or combustion.

* * * * *